US012693681B1

(12) United States Patent (10) Patent No.: US 12,693,681 B1
Gayaka et al. (45) Date of Patent: Jul. 28, 2026

(54) SYSTEM TO CHARACTERIZE COLLISION OF AN AUTONOMOUS MOBILE DEVICE

(71) Applicant: AMAZON TECHNOLOGIES, INC., Seattle, WA (US)

(72) Inventors: Shreekant Gayaka, Fremont, CA (US); Chang Young Kim, Newark, CA (US); Xin Yang, Sammamish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 37 days.

(21) Appl. No.: 18/622,408

(22) Filed: Mar. 29, 2024

(51) Int. Cl.
| | |
|---|---|
| *G05D 1/06* | (2006.01) |
| *G05D 1/639* | (2024.01) |
| *G05D 101/15* | (2024.01) |
| *G05D 111/50* | (2024.01) |

(52) U.S. Cl.
CPC ......... *G05D 1/639* (2024.01); *G05D 2101/15* (2024.01); *G05D 2111/52* (2024.01); *G05D 2111/54* (2024.01)

(58) Field of Classification Search
CPC .......................... G05D 1/639; G05D 2111/54; G05D 2111/52; G05D 2101/15
USPC ......................................................... 701/23
See application file for complete search history.

(56) References Cited

U.S. PATENT DOCUMENTS

| | | |
|---|---|---|
| 2004/0019426 A1 | 1/2004 | Knoop et al. |
| 2013/0261869 A1 | 10/2013 | Brenneis et al. |
| 2014/0067206 A1 | 3/2014 | Pflug |
| 2017/0197619 A1 | 7/2017 | Kelly |
| 2020/0217873 A1* | 7/2020 | Jiang ..................... G01C 25/005 |
| 2020/0331148 A1 | 10/2020 | Zhang et al. |
| 2021/0341915 A1* | 11/2021 | Liu ....................... G05D 1/0044 |
| 2021/0365029 A1* | 11/2021 | Molina Cabrera .... G05D 1/027 |
| 2022/0055626 A1* | 2/2022 | Gariepy .................. B60T 8/175 |
| 2022/0219691 A1 | 7/2022 | Maleki |
| 2023/0311947 A1* | 10/2023 | Chong .................... G06V 20/58 701/26 |
| 2025/0231560 A1* | 7/2025 | Dam ......................... G05D 1/22 |

OTHER PUBLICATIONS

"Simpson's Rule", Wikipédia, 12 pages. Retrieved from the Internet on Jan. 26, 2024. URL: https://en.wikipedia.org/wiki/Simpson%27s_rule.

(Continued)

*Primary Examiner* — Mahmoud S Ismail
(74) *Attorney, Agent, or Firm* — Lindauer Law, PLLC

(57) ABSTRACT

An autonomous mobile device (AMD) moves within in a physical space. The AMD may encounter features in the physical space, such as flooring transitions, or obstacles that may impede movement. Sensors such as an ultrasonic sensor, optical time of flight sensors, inertial measurement unit (IMU), wheel speed sensors, and motor torque sensors acquire sensor data. Based on the sensor data, a location of an obstacle, and characterize whether that obstacle is traversable or non-traversable, is determined. If traversable, the AMD may continue moving past the obstacle. If non-traversable, the location of the obstacle may be added to a map used for route planning. Based on the location of the non-traversable obstacle, the AMD may move to a recovery location away from the obstacle, and resume moving.

20 Claims, 12 Drawing Sheets

(56)  References Cited

OTHER PUBLICATIONS

"Numpy.trapz", 2 pgs. Retrieved from the Internet on Jan. 24, 2024:
URL: https://numpy.org/doc/stable/reference/generated/numpy.trapz.
html.
Glenn III, Frank T., "Non-final Office Action dated Nov. 6, 2025",
U.S. Appl. No. 18/622,458, The United States Patent and Trademark
Office, filed Nov. 6, 2025.

* cited by examiner

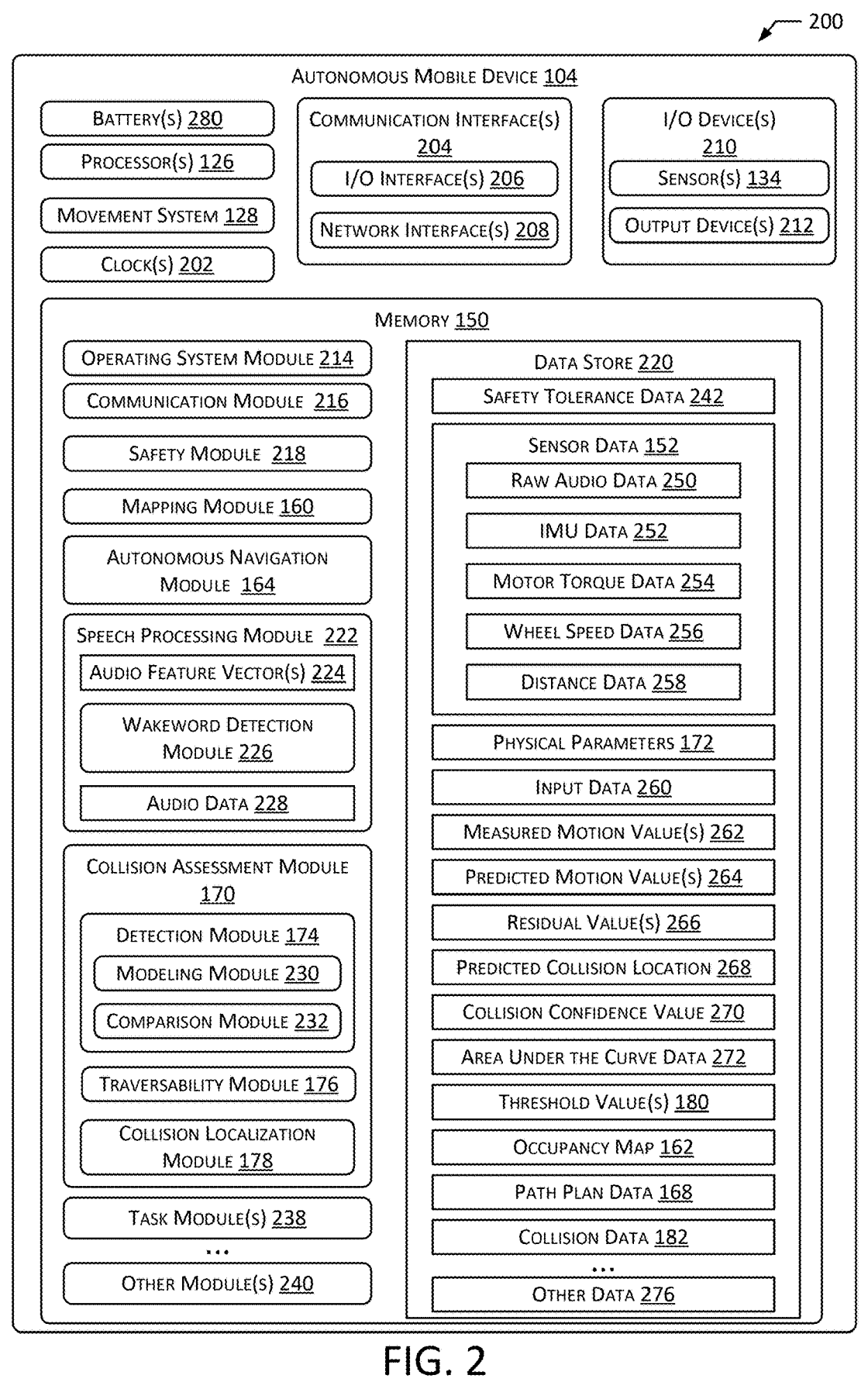

200

AUTONOMOUS MOBILE DEVICE 104

BATTERY(S) 280

PROCESSOR(S) 126

MOVEMENT SYSTEM 128

CLOCK(S) 202

COMMUNICATION INTERFACE(S) 204

I/O INTERFACE(S) 206

NETWORK INTERFACE(S) 208

I/O DEVICE(S) 210

SENSOR(S) 134

OUTPUT DEVICE(S) 212

MEMORY 150

OPERATING SYSTEM MODULE 214

COMMUNICATION MODULE 216

SAFETY MODULE 218

MAPPING MODULE 160

AUTONOMOUS NAVIGATION MODULE 164

SPEECH PROCESSING MODULE 222

AUDIO FEATURE VECTOR(S) 224

WAKEWORD DETECTION MODULE 226

AUDIO DATA 228

COLLISION ASSESSMENT MODULE 170

DETECTION MODULE 174

MODELING MODULE 230

COMPARISON MODULE 232

TRAVERSABILITY MODULE 176

COLLISION LOCALIZATION MODULE 178

TASK MODULE(S) 238

...

OTHER MODULE(S) 240

DATA STORE 220

SAFETY TOLERANCE DATA 242

SENSOR DATA 152

RAW AUDIO DATA 250

IMU DATA 252

MOTOR TORQUE DATA 254

WHEEL SPEED DATA 256

DISTANCE DATA 258

PHYSICAL PARAMETERS 172

INPUT DATA 260

MEASURED MOTION VALUE(S) 262

PREDICTED MOTION VALUE(S) 264

RESIDUAL VALUE(S) 266

PREDICTED COLLISION LOCATION 268

COLLISION CONFIDENCE VALUE 270

AREA UNDER THE CURVE DATA 272

THRESHOLD VALUE(S) 180

OCCUPANCY MAP 162

PATH PLAN DATA 168

COLLISION DATA 182

...

OTHER DATA 276

FIG. 2

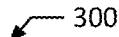

300

NETWORK INTERFACES 208

- WLAN INTERFACE 302
- PAN INTERFACE 304
- SECONDARY RF LINK INTERFACE 306
- ⋮
- OTHER 308

OUTPUT DEVICE(S) 212

- MOTOR 132
- LIGHT 382
- SPEAKER 384
- DISPLAY 386
- PROJECTOR 388
- SCENT DISPENSER 390
- ACTUATOR(S) 392
- ⋮
- OTHER 394

SENSOR(S) 134

- MOTOR TORQUE SENSOR 138
- WHEEL SPEED SENSOR 140
- SUSPENSION WEIGHT SENSOR 312
- BUMPER SWITCH 314
- FLOOR OPTICAL MOTION SENSOR 316
- DISTANCE SENSOR(S) 142
  - ULTRASONIC SENSOR 318
  - OPTICAL SENSOR (E.G. ToF) 320
  - RADAR 322
  - LIDAR 324
  - STEREO-CAMERA 326

- PAYLOAD WEIGHT SENSOR 328
- TEMPERATURE SENSOR 330
- INTERLOCK SENSOR 332
- IMU 136
  - GYROMETER 334
  - ACCELEROMETER 336
- MAGNETOMETER 338
- LOCATION SENSOR 340
- PHOTODETECTOR 342
- CAMERA (E.G. VISIBLE, IR, UV) 344
- MICROPHONE 346

- AIR PRESSURE SENSOR 348
- AIR QUALITY SENSOR 350
- AMBIENT LIGHT SENSOR 352
- AMBIENT TEMPERATURE SENSOR 354
- FLOOR ANALYSIS SENSOR 356
- CASTER ROTATION SENSOR 358
- PASSIVE INFRARED SENSOR 362
- MAST POSITION SENSOR 364
- MAST STRAIN SENSOR 366
- ⋯
- OTHER SENSOR 368

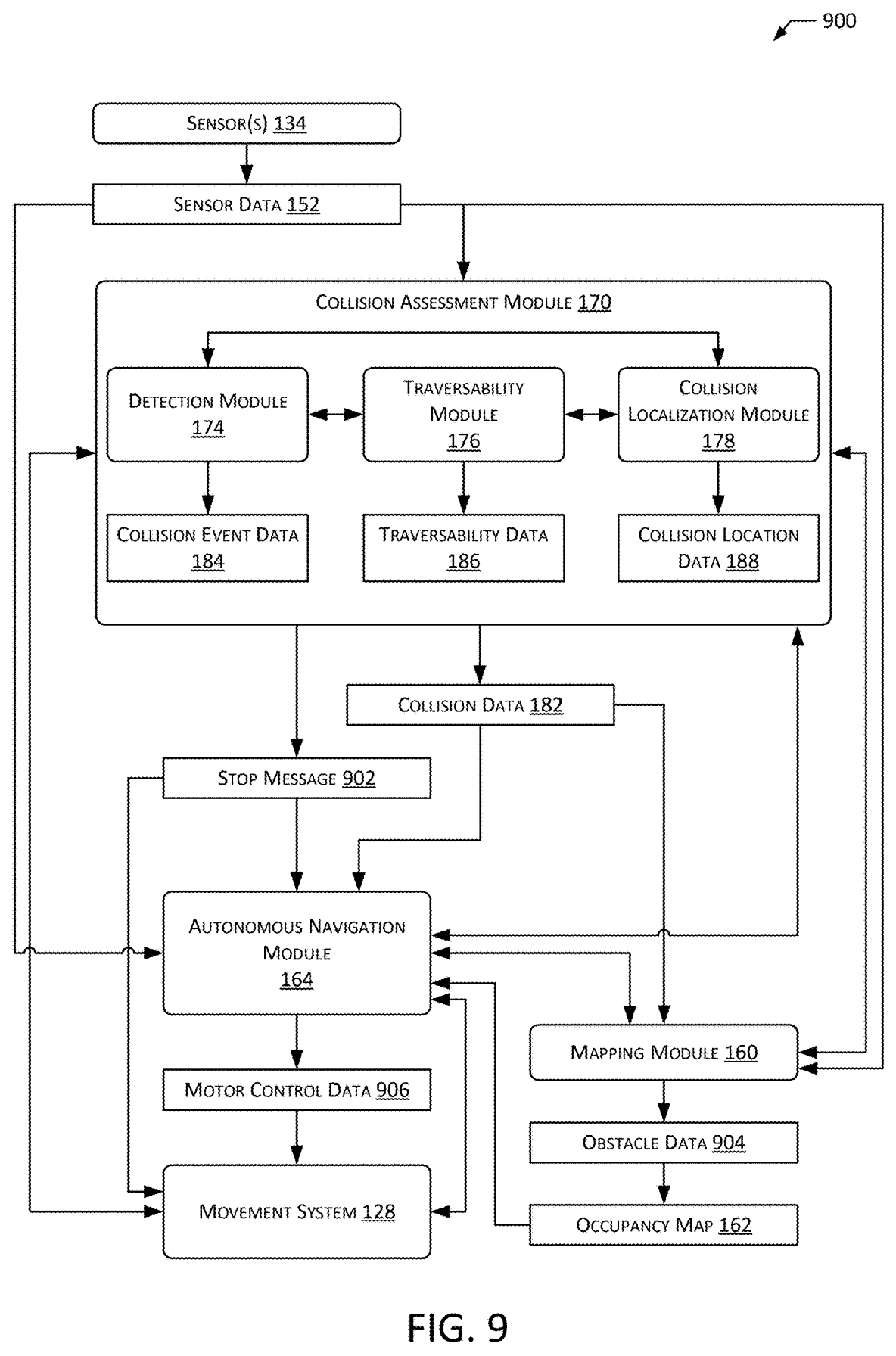

SENSOR(S) 134

SENSOR DATA 152

COLLISION ASSESSMENT MODULE 170

DETECTION MODULE 174

TRAVERSABILITY MODULE 176

COLLISION LOCALIZATION MODULE 178

COLLISION EVENT DATA 184

TRAVERSABILITY DATA 186

COLLISION LOCATION DATA 188

COLLISION DATA 182

STOP MESSAGE 902

AUTONOMOUS NAVIGATION MODULE 164

MOTOR CONTROL DATA 906

MAPPING MODULE 160

OBSTACLE DATA 904

MOVEMENT SYSTEM 128

OCCUPANCY MAP 162

FIG. 9

SYSTEM TO CHARACTERIZE COLLISION OF AN AUTONOMOUS MOBILE DEVICE

BACKGROUND

An autonomous mobile device (AMD) moves throughout a physical space that may include obstacles, uneven floors, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 2 is a block diagram of the AMD, according to some implementations.

FIG. 3 is a block diagram of some components of the AMD, according to some implementations.

FIG. 9 depicts a block diagram of operation of the AMD to determine traversability and location of an obstacle, according to some implementations.

Figure 1:
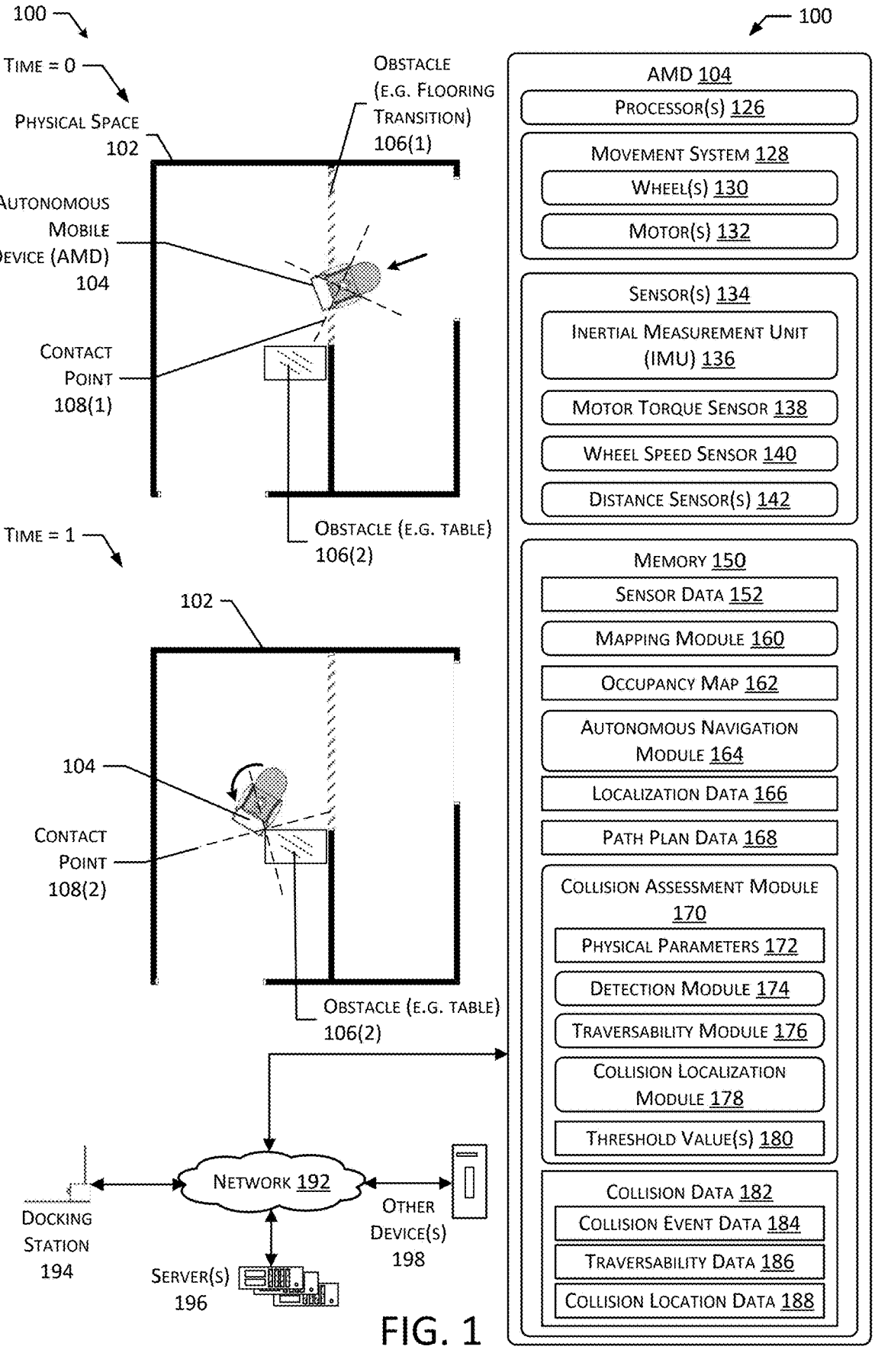
FIG. 1 illustrates an autonomous mobile device (AMD) with a collision assessment module that determines traversability and location of an obstacle, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) such as a robot is capable of autonomous movement that allows the AMD to move between locations in a physical space without being driven or controlled by a user. A movement system may include one or more motors driving one or more of wheels or legs to enable the movement of the AMD. In implementations in which the AMD utilizes wheels or legs, the wheels or legs are supported by a floor or other surface. The floor may be relatively flat or may have features such as elevation changes or transitions, uneven flooring surfaces, and so forth.

While moving through the physical space the AMD moves across the floor. During this movement, the AMD may collide with obstacles. For example, while the AMD is moving it may inadvertently come into contact with an obstacle that is difficult to detect such as a hard-to-see obstacle (e.g. a clear glass table), an overhanging obstacle, a low obstacle, and so forth. In another example, an obstacle may be undetected because it is occluded from view of a sensor by a portion of the AMD. In yet another example, while moving across the floor the AMD may experience bumps due to elevation changes of the floor.

Sensors such as bumper switches and similar mechanisms may be used to detect a collision. However, this requires the AMD being designed to have such switches installed, increasing the part count of the AMD and the overall cost. Even if bumper switches were added to the AMD, it may be infeasible to equip every surface of the AMD to detect collisions from different directions. As a result, some collisions may not be detected.

Sensors that detect inertial movements, such as inertial measurement units (IMUs) that may include accelerometers, gyrometers, and so forth, may be used to detect collisions. For example, if the IMU detects an acceleration that exceeds a threshold value, a collision may be deemed to have taken place. However, the comparison of only data from an IMU to a threshold may result in false positive collisions. For example, as the AMD encounters and moves past a transition or other elevation change in a floor, it may experience a bump or set of transitory accelerations. Continuing the example, the bump comprises a rapid vertical acceleration as the AMD is displaced upwards and may also include accelerations with respect to other axes. This acceleration may exceed a threshold value previously associated with a collision. In such a situation, this would result in the AMD incorrectly determining a collision has taken place. Responsive to the detection of the false collision, the AMD may stop. This is an undesirable behavior and may result in the AMD failing to perform a task, resulting in a poor user experience.

The AMD may include other sensors, such as distance sensors, to attempt to avoid collisions with obstacles. The distance sensors may comprise time of flight (ToF) sensors, stereovision, or other sensors that provide distance data indicative of a distance value from the distance sensor to a detected object. The distance sensors may include optical ToF sensors, acoustic (sonar), radio frequency (radar), and so forth. However, the distance sensors may be unable to detect certain types of obstacles. For example, an optical ToF sensor may be unable to detect a transparent obstacle, an acoustic ToF sensor may be unable to detect a cloth covered obstacle, and so forth. As a result, the AMD may inadvertently collide with an obstacle that is undetected.

Described in this disclosure are techniques and systems for determining collision data and operating an AMD based on the collision data. The collision data may include one or more of collision event data, traversability data, or collision location data.

The collision event data may be indicative of a collision event. For example, the collision event data may specify a time when a collision is deemed to have occurred.

The traversability data indicates if the obstacle is able to be traversed by the AMD or not. With regard to traversable obstacles, the AMD may continue moving without stopping. For example, upon encountering a traversable obstacle such as a flooring threshold, the AMD may continue moving. In comparison, upon encountering a non-traversable obstacle the AMD may stop moving and the location of the non-traversable obstacle may be added to the map. Once stopped, the AMD may move to a recovery location, such as backing away from the location of the non-traversable obstacle as indicated by the collision location data. During subsequent operation, the AMD may use the map to plan a route to move within the physical space that avoids the location of the non-traversable obstacle. For example, after bumping into a clear glass table, the AMD may choose another route that attempts to avoid where the collision took place.

The collision location data specifies a location of the collision with respect to a map that represents the physical space. For example, the collision location data may indicate that the AMD has experienced a collision with an obstacle at specified coordinates with regard to an occupancy map.

One or more sensors of the AMD acquire sensor data. The sensor data may include motor torque data indicative of torque being applied to one or more motors used to move the AMD. The sensor data may also include a wheel speed sensor, indicative of rotation of a wheel associated with locomotion of the AMD. The sensor data may include IMU data acquired by an IMU. For example, the IMU data may include information about linear acceleration, angular acceleration, linear velocity, angular velocity, and so forth with respect to one or more axes of the IMU that is affixed to the AMD. The sensor data may include distance data comprising distance values from respective ones of the distance sensors to an object, if any, within range of a respective distance sensor.

The sensor data is processed by a collision assessment module that determines the collision data. The collision assessment module may include a detection module that determines the collision event data, a traversability module that determines the traversability data, and a collision localization module that determines the collision location data.

In one implementation, the collision assessment module may determine collision event data based on a difference between predicted and measured motion values. Measured motion values may be determined based on sensor data, such as wheel speed data or motor torque data.

Predicted motion values may be determined based on the sensor data and one or more physical parameters using a physics-based model. The physical parameters describe the AMD such as its total mass or weight, location relative to the axes of the center of mass, radii of the wheels, distance between the wheels, moment of inertia of the AMD, and so forth. The predicted motion values are representative of how, given the input values, the AMD would be expected to move. For example, given the physical parameters and sensor data such as the measured motor torque and wheel speeds, a predicted velocity may be calculated.

Residual values are calculated based on the measured motion values and the predicted motion values. For example, the residual values may comprise the difference between the measured and predicted motion values with respect to a particular axis of the AMD. The residual values may be indicative of one or more of a linear residual or an angular residual. For example, a first linear residual may be indicative of a variance between the measured linear motion and predicted linear motion with respect to a first axis. In another example, a first angular residual may be indicative of a variance between the measured angular motion and predicted angular motion with respect to a second axis.

The residual values may then be compared to threshold values to determine whether a collision has occurred. For example, if the residual values exceed a collision threshold value, a collision may be deemed to have occurred. Different threshold values may be specified for linear residuals and angular residuals. Different threshold values may also be specified for particular axes.

In another implementation, the detection module may determine a collision event as occurring at a specified time if one or more acceleration values in the IMU data exceed a threshold value.

Once a collision event has been determined, one or more of the traversability module or the collision localization module may process the sensor data associated with the collision event to determine the collision data.

Data from the distance sensors that is associated with the time of the collision event may be assessed to determine the collision data. For example, the sensor data may comprise distance data comprising distance values acquired from different distance sensors to detect an object, if any. Different distance sensors may have different respective fields of view (FOV). For example, a first ToF distance sensor may have an FOV looking directly ahead from the AMD, a second ToF distance sensor may have an FOV looking forward and to the right of the AMD, and so forth. If a distance value from a distance sensor is less than or equal to a distance threshold value, a collision may be deemed to be non-traversable and have taken place with a relative location associated with the AMD that corresponds to the distance sensor reporting the distance value.

As mentioned above, some obstacles may be "hard-to-see" in that a distance sensor may be unable to reliably detect the presence of the obstacle. Obstacles may also be undetected due to other factors such as their shape, due to occlusion of the sensor FOV by a portion of the AMD, and so forth. For example, an overhanging or low height obstacle may not be detected. In another example, part of a sensor FOV may be blocked by a portion of the AMD, resulting in a "blind spot" for which no sensor data is available to determine an obstacle. As a result, the collision assessment module may use other sensor data to determine if a collision took place.

The traversability module may determine the traversability of the obstacle. If the distance value from a distance sensor is less than or equal to a threshold value, a collision may be deemed to be non-traversable. If not, an area under the curve (AUC) of the velocity residual values may be calculated. If the AUC is less than a threshold AUC value the obstacle may be deemed to be traversable. If the AUC is greater than or equal to the threshold AUC value, a pitch value of the AMD may be assessed. If the pitch value is within a threshold range of pitch values, the obstacle may be deemed to be non-traversable. In another implementation the pitch value may be assessed first, followed by the AUC assessment. If both the AUC is greater than or equal to the AUC threshold and the pitch value is within the threshold range of pitch values, the obstacle may be deemed to be non-traversable. If non-traversable, the location of the obstacle as indicated by the collision location data may be added to a map. For example, the location of the obstacle may be added to an occupancy map that is used for route planning.

The collision localization module may use the residual values determined by the detection module to determine the collision location data. Based on the axis associated with the residual and a sign indicative of whether the residual is positive or negative, a relative location of the collision may be specified with respect to the AMD. For example, based on the residual values a collision may be deemed to occur at a front of the AMD, at a rear of the AMD, and so forth. Given the known location of the AMD, such as localization data provided by an autonomous navigation module, and the relative location, the collision location data may be determined as to where the obstacle is with respect to the physical space.

A machine learning module may accept as input the IMU data and the velocity residual data and determine as output a predicted collision location and a collision confidence value. In one implementation the machine learning module may utilize a logistic regression algorithm.

If the collision confidence value is greater than or equal to a confidence threshold value, collision location data may be determined based on the predicted collision location. Given the predicted collision location with respect to the AMD, localization data, and the relative location, the collision location data may be determined as to where the obstacle is with respect to the physical space.

If the collision confidence value is less than the confidence threshold value, the collision location data may be determined based on the direction of motion of the AMD before the collision event. For example, if the AMD was moving forward before the collision event, the collision may be deemed to have taken place at the front of the AMD. Given the assumed location, localization data, and the relative location, the collision location data may be determined as to where the obstacle is with respect to the physical space.

By using these techniques and systems the AMD is able to quickly and accurately determine whether an obstacle causing a collision impedes travel and a location of the obstacle. The AMD may continue moving if the obstacle is traversable and stop and perform a recovery action if the obstacle is non-traversable. The location of the non-traversable obstacles may be added to a map, allowing future avoidance of the obstacle. This improves operational safety of the AMD and avoids future collisions with an obstacle that is not reliably detected by the sensors onboard the AMD. As a result, the AMD is able to more safely and effectively move throughout the physical space.

ILLUSTRATIVE SYSTEM

FIG. 1 illustrates at 100, a physical space 102 that includes an autonomous mobile device (AMD) 104. The physical space 102 may include one or more obstacles 106. These obstacles 106 may include flooring transitions 106(1), tables 106(2), uneven floors (not shown), and so forth.

An obstacle 106 may prevent traversal by the AMD 104. For example, an obstacle 106 may comprise a wall, stairwell, and so forth. Some obstacles 106 may not prevent traversal. For example, the AMD 104 that rolls on wheels or walks on legs is supported by a floor. The floor may include a flooring transition 106(1) comprising a piece of material that is placed between two dissimilar pieces of flooring material, to join separate sections of the same or different flooring materials, and so forth. For example, a wooden "T" molding may be used to conceal a gap between two sections of wood flooring. Once installed, the piece of molding may have an uppermost portion that is higher than the surrounding flooring. In another example, the flooring transition 106(1) may omit the different material. For example, a concrete floor may directly abut a wood floor. Regardless of whether the flooring materials are the same or different, elevation changes may also be present in the flooring of the physical space 102. These elevation changes may be relatively minor and limited to a particular area, such as a 1 cm height difference in flooring between rooms. A flooring transition 106(1) comprising a small ramp or quarter round molding may be used to accommodate this height difference. In other circumstances, such as with uneven flooring surfaces such as cobblestones or uncut stone, elevation changes may be present over a larger area.

As discussed in more detail later, some obstacles 106 may be difficult to reliably detect. For example, an obstacle 106(2) such as a glass table may be unable to be detected by an optical time of flight (ToF) sensor. In another example, an obstacle 106 (not shown) such as a fabric covered couch may be unable to be detected by a radar sensor.

The AMD 104 includes one or more hardware processors 126 (processors) configured to execute one or more stored instructions. The processors 126 may comprise one or more cores. The processors 126 may include microcontrollers, systems on a chip, field programmable gate arrays, digital signal processors, graphic processing units, general processing units, and so forth.

The AMD 104 includes a movement system 128. The movement system 128 may comprise one or more wheels 130 driven by one or more motors 132 or other actuators to enable the AMD 104 to move from one location in the physical space 102 to another. For example, a motor 132 may be used to drive a wheel 130 attached to a chassis of the AMD 104, which causes the AMD 104 to move. In some implementations, the AMD 104 may include non-driven wheels, such as casters. The AMD 104 may turn, move forward, move backward, and so forth. In another example, actuators may move legs allowing the AMD 104 to walk.

The AMD 104 is supported by an obstacle 106 such as the floor. The points at which the AMD 104 comes into contact with an obstacle 106 are contact points 108. During normal operation of a wheeled AMD 104, the contact points 108 are the bottom of the wheels 130. For example, at time=0 the AMD 104 is shown moving over a flooring transition obstacle 106(1). The wheels 130 come into contact with the flooring transition obstacle 106(1), and are the contact points 108(1), one for each wheel 130 used. Depending on various factors, such as elevation changes in the flooring, speed, size of the wheels 130, and so forth, the AMD 104 may experience a bump as it traverses over an obstacle 106 that presents an elevation change.

The AMD 104 may come into contact with other obstacles 106. For example, the AMD 104 may strike an obstacle 106(2) such as a glass table as shown at time=1. As shown at time=1, the point of contact 108(2) is on a left front portion of the AMD 104. A collision assessment module 170 (described below) may be used to determine where a collision has occurred and characterize the obstacle 106 as traversable or non-traversable.

The AMD 104 includes one or more sensors 134. The sensors 134 may comprise an inertial measurement unit (IMU) 136, a motor torque sensor 138, wheel speed sensor 140, or other sensors. The IMU 136 may comprise one or more accelerometers and gyrometers, and so forth. The motor torque sensor 138 may comprise circuitry to determine a shaft torque of one or more of the motors 132 of the movement system 128. In one implementation the motor torque sensor 138 may utilize a direct measurement of shaft torque, such as based on output from a strain gauge. In another implementation the motor torque sensor 138 may determine the shaft torque based on measurement of electrical current provided to the motor 132. The wheel speed sensor 140 determines wheel data indicative of a movement of one or more of the wheels 130. The wheel speed sensor 140 may comprise an optical encoder, Hall effect sensor, or other device to determine an angular rate or rotation of a wheel such as the wheels 130, casters, and so forth. Output from the wheel speed sensor 140 may comprise wheel encoder data. Distance sensors 142 determine a distance to an object. For example, distance sensors 142 may comprise optical ToF, acoustic (ultrasound), radar, and so forth. The sensors 134 are discussed in more detail with regard to FIG. 3.

The AMD 104 includes one or more memories 150. These may store sensor data 152 acquired by one or more of the sensors 134, such as IMU data 252, motor torque data 254, and wheel speed data 256. For example, the IMU 136 may provide as output IMU data 252 indicative of accelerations and rotations. In another example, the motor torque sensor 138 may provide motor torque data 254 indicative of motor torque at particular times. In another example, the wheel speed sensor 140 may provide wheel speed data 256 indicative of an angular velocity at particular times.

A mapping module 160 may use sensor data 152 to determine an occupancy map 162. The occupancy map 162 is indicative of one or more obstacles 106 and their locations in the physical space 102. For example, the occupancy map 162 may indicate the presence of obstacles 106 such as walls, furniture, flooring transitions 106(1), and so forth. In some implementations the occupancy map 162 may include information determined by the collision assessment module 170. For example, the occupancy map 162 may include information indicating a portion of the physical space 102 that includes uneven flooring.

An autonomous navigation module 164 provides the AMD 104 with the ability to navigate within the physical space 102 without real-time human interaction. The autonomous navigation module 164 may implement, or operate in conjunction with, the mapping module 160 to determine the occupancy map 162. For example, the autonomous navigation module 164 and the mapping module 160 may perform an exploration of the physical space 102 to acquire sensor data 152 about the physical space 102 that is then used to determine the occupancy map 162. Given a location and pose of the AMD 104 as specified by the localization data 166 and the sensor data 152 acquired at that location and pose, the mapping module 160 may construct an occupancy map 162 indicative of the obstacles 106 that are detected by the sensors 134.

The mapping module 160, autonomous navigation module 164, or another module may determine localization data 166 based at least in part on sensor data 152. In one implementation, the mapping module 160 may utilize simultaneous localization and mapping (SLAM) to process sensor data 152 and determine localization data 166 indicative of a location of the AMD 104 in the physical space 102 and a pose or orientation of the AMD 104 with respect to one or more reference axes. For example, IMU data, wheel speed data, and so forth may be used to determine the location and pose of the AMD 104 in the physical space 102.

The autonomous navigation module 164 may generate path plan data 168 that is indicative of a path through the physical space 102 from the current location of the AMD 104 to a destination location based on the occupancy map 162. The AMD 104 may then begin moving along the path. The autonomous navigation module 164 is discussed in more detail with regard to FIG. 2.

The memory 150 may also store a collision assessment module 170. The collision assessment module 170 may store or otherwise access physical parameters 172 associated with the AMD 104. The physical parameters 172 are representative of the AMD 104. They may be determined for the specific AMD 104, such as measured once manufacture is finished, or may be determined for a specified model or version of the AMD 104 and subsequently used for later produced units. The physical parameters 172 may comprise one or more of mass (or weight) of the AMD 104, location of a center of mass (or center of gravity) of the AMD 104, radius of the wheel(s) 130, distance between a centerline of the AMD 104 and the wheel(s) 130, moment of inertia of the wheel(s) 130, moment of inertia of a body of the AMD 104, information about the exterior shape of the AMD 104 relative to a reference point such as the center of rotation, and so forth.

The collision assessment module 170 may accept as input the sensor data 152. Based on the physical parameters 172, the sensor data 152, and one or more threshold values 180, the collision assessment module 170 determines collision data 182. The collision data 182 comprises collision event data 184, traversability data 186, and collision location data 188. The collision assessment module 170 may comprise a detection module 174, a traversability module 176, and a collision localization module 178.

The detection module 174 determines if a collision has occurred and provides as output collision event data 184. The collision event data 184 may be indicative of a time that the collision is determined to have occurred. In one implementation the detection module 174 may determine a collision has occurred based on a difference between predicted motion values and measured motion values. The detection module 174 may include a modeling module and a comparison module. The modeling module accepts as input physical parameters 172 and at least a portion of the sensor data 152 to determine predicted motion values. The modeling module may utilize a physics-based model of the AMD 104, as parameterized by the physical parameters 172, to determine the predicted motion values. For example, given motor torque data for each of the driven wheels 130, the modeling module may determine predicted motion values such as a linear velocity indicative of a linear direction and linear speed, an angular velocity indicative of a rotational direction and angular speed, and so forth.

The comparison module accepts as input the measured motion values and the predicted motion values and determines residual values. For example, the measured motion value of measured linear velocity with respect to an X axis may be subtracted from a predicted motion value of measured linear velocity with respect to the X axis. The residual values are indicative of a variance between the measured and predicted values. The residual values may then be compared to corresponding threshold values 180. If one or more residual values exceed a corresponding threshold value 180, collision data 182 indicative of a collision may be generated. If the residual values 266 do not exceed the corresponding threshold values 180, the collision data 182 may indicate no collision has occurred.

The traversability module 176 may determine the traversability data 186. The traversability data 186 is indicative of traversability of an obstacle 106. A traversable object does not prevent movement of the AMD 104, while a non-traversable object blocks movement of the AMD 104. For example, an elevation change or door threshold may be deemed a traversable object. In comparison, a table that blocks movement of the AMD 104 may be deemed a non-traversable object. A non-traversable object may be added to the occupancy map 162. Once added, the autonomous navigation module 164 would attempt to determine path plan data 168 that avoids the non-traversable object that is now represented in the occupancy map 162.

The collision localization module 178 may determine the collision location data 188. The collision location data 188 is indicative of a location, with respect to the physical space 102, of an obstacle 106 associated with a collision. In one implementation the collision localization module 178 may determine relative location of a collision, such as which portion of the AMD 104 may have collided with an obstacle 106. Based on the localization data 166, the relative location, and the physical parameters 172 indicating the shape of the AMD 104, the collision location data 188 may be determined.

Operation of the collision assessment module 170 is discussed in more detail with regard to the following figures.

The AMD 104 may use network interfaces to connect to a network 192. For example, the network 192 may comprise a wireless local area network, that in turn is connected to a wide area network such as the Internet.

The AMD 104 may be configured to dock or connect to a docking station 194. The docking station 194 may provide external power which the AMD 104 may use to charge a battery of the AMD 104.

The docking station 194 may also be connected to the network 192. For example, the docking station 194 may be configured to connect to the wireless local area network 192 such that the docking station 194 and the AMD 104 may communicate.

The AMD 104 may access one or more servers 196 via the network 192. For example, the AMD 104 may utilize a wakeword detection module to determine if a user is addressing a request to the AMD 104. The wakeword detection module may hear a specified word or phrase and transition the AMD 104 or portion thereof to the wake operating mode. Once in the wake operating mode, the AMD 104 may then transfer at least a portion of the audio spoken by the user to one or more servers 196 for further processing. The servers 196 may process the spoken audio and return to the AMD 104 data that may be subsequently used to operate the AMD 104.

The AMD 104 may also communicate with other devices 198. The other devices 198 may include one or more devices that are within the physical space 102 such as a home or associated with operation of one or more devices in the physical space 102. For example, the other devices 198 may include a doorbell camera, a garage door opener, a refrigerator, washing machine, and so forth. In some implementations, the other devices 198 may include other AMDs 104, vehicles, and so forth.

In other implementations, other types of autonomous mobile devices (AMD) may use the systems and techniques described herein. For example, the AMD 104 may comprise an autonomous ground vehicle that is moving on a street, an autonomous aerial vehicle in the air, autonomous marine vehicle, and so forth.

FIG. 2 is a block diagram 200 of the AMD 104, according to some implementations.

The AMD 104 may include one or more batteries 280 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

The AMD 104 may include one or more hardware processors 126 (processors) configured to execute one or more stored instructions. The processors 126 may comprise one or more cores. The processors 126 may include microcontrollers, systems on a chip, field programmable gate arrays, digital signal processors, graphic processing units, general processing units, and so forth.

The movement system 128 of the AMD 104 may include one or more wheels 130 that are driven by one or more motors 132 or other actuators to enable the AMD 104 to move from one location in the physical space 102 to another.

One or more clocks 202 may provide information indicative of date, time, ticks, and so forth. For example, the processor 126 may use data from the clock 202 to associate a particular time with an action, sensor data 152, and so forth.

The AMD 104 may include one or more communication interfaces 204 such as input/output (I/O) interfaces 206, network interfaces 208, and so forth. The communication interfaces 204 enable the AMD 104, or components thereof, to communicate with other devices 198 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 210. The I/O devices 210 may include input devices such as one or more of a sensor 134, keyboard, mouse, scanner, and so forth. The I/O devices 210 may also include output devices 212 such as one or more of a motor 132, light, speaker, display, projector, printer, and so forth. In some embodiments, the I/O devices 210 may be physically incorporated with the AMD 104 or may be externally placed.

The network interfaces 208 may be configured to provide communications between the AMD 104 and other devices 198 such as other AMDs 104, docking stations 194, routers, access points, and so forth. The network interfaces 208 may include devices configured to couple to personal area networks (PANs), local area networks (LANs), wireless local area networks (WLANS), wide area networks (WANs), and so forth. For example, the network interfaces 208 may include devices compatible with Ethernet, Wi-Fi, Bluetooth, Bluetooth Low Energy, ZigBee, and so forth. The AMD 104 may also include one or more buses or other internal communications hardware or software that allow for the transfer of data between the various modules and components of the AMD 104.

As shown in FIG. 2, the AMD 104 includes one or more memories 150. The memory 150 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 150 provides storage of computer-readable instructions, data structures, program modules, and other data for the operation of the AMD 104. A few example functional modules are shown stored in the memory 150, although the same functionality may alternatively be implemented in hardware, firmware, or as a system on a chip (SoC).

The memory 150 may include at least one operating system (OS) module 214. The OS module 214 is configured to manage hardware resource devices such as the I/O interfaces 206, the I/O devices 210, the communication interfaces 204, and provide various services to applications or modules executing on the processors 126. The OS module 214 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; or the Robot Operating System (ROS).

Also stored in the memory 150 may be a data store 220 and one or more of the following modules. These modules may be executed as foreground applications, background tasks, daemons, and so forth. The data store 220 may use a flat file, database, linked list, tree, executable code, script, or other data structure to store information. In some implementations, the data store 220 or a portion of the data store 220 may be distributed across one or more other devices 198 including other AMDs 104, servers 196, network attached storage devices, and so forth.

A communication module 216 may be configured to establish communication with other devices 198, such as other AMDs 104, an external server 196, a docking station 194, and so forth. The communications may be authenticated, encrypted, and so forth.

Other modules within the memory 150 may include a safety module 218, the mapping module 160, the autonomous navigation module 164, a speech processing module 222, the collision assessment module 170, one or more task modules 238, or other modules 240. The modules may access data stored within the data store 220, including safety tolerance data 242, sensor data 152, the occupancy map 162, other data 226, and so forth. The sensor data 152 may comprise one or more of raw audio data 250 acquired using one or more microphones, IMU data 252 acquired by the IMU 136, motor torque data 254 acquired by the motor torque sensor 138, wheel speed data 256 acquired by the wheel speed sensor 140, distance data 258 acquired by the distance sensor(s) 142, and so forth.

The safety module 218 may access the safety tolerance data 242 to determine within what tolerances the AMD 104 may operate safely within the physical space 102. The safety module 218 may include, or operate in conjunction with, a collision avoidance system. For example, the safety module 218 may be configured to stop the AMD 104 from moving when an obstacle 106 is determined to be present along the AMD's 104 path of travel. Movement of the AMD 104 may be stopped by one or more of inhibiting operations of one or more of the motors 132, issuing a command to stop motor operation, disconnecting power from one or more of the motors 132, and so forth. The safety module 218 may be implemented as hardware, software, or a combination thereof.

The safety module 218 may control other factors, such as a maximum speed of the AMD 104 based on information obtained by the sensors 134, precision and accuracy of the sensor data 152, and so forth. For example, a maximum speed permitted by the safety module 218 may be based on one or more factors such as the weight of the AMD 104, nature of the floor, distance to a nearest obstacle 106, and so forth.

As the AMD 104 moves through the physical space 102, the mapping module 160 may use sensor data 152 to determine the occupancy map 162 of the physical space 102. For example, image data from one or more cameras may be processed to determine the presence of obstacles 106, approximate locations in the physical space 102, category of obstacle 106, and so forth. The occupancy map 162 may represent dimensions of the physical space 102 and obstacles 106 within the physical space 102. The occupancy map 162 may also include information about the obstacle 106, such as size, position, and orientation.

In some implementations, the occupancy map 162 may comprise a plurality of cells with each cell of the plurality of cells representing a particular area in the physical space 102. The occupancy map 162 may indicate whether an area of the physical space 102 associated with a given cell includes an obstacle 106.

The autonomous navigation module 164 provides the AMD 104 with the ability to navigate within the physical space 102 without real-time human interaction. The autonomous navigation module 164 may implement, or operate in conjunction with, the mapping module 160 to determine localization data 166 and the occupancy map 162 or other representation of the physical space 102. In one implementation, the mapping module 160 may use one or more simultaneous localization and mapping ("SLAM") techniques. The SLAM algorithms may utilize one or more of maps, algorithms, beacons, or other techniques to navigate. The autonomous navigation module 164 may use the occupancy map 162 to determine a set of possible paths along which the AMD 104 may move. One of these may be selected and used to determine path plan data 168 indicative of a path. For example, a possible path that is the shortest or has the fewest turns may be selected and used to determine the path. The path is then subsequently used to determine a set of commands that drive the motors 132 connected to the wheels 130.

The autonomous navigation module 164 may utilize various techniques during processing of sensor data 152. For example, image data obtained from cameras on the AMD 104 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The AMD 104 may move responsive to a determination made by an onboard processor 126, in response to a command received from one or more communication interfaces 204, as determined from the sensor data 152, and so forth. For example, an external server 196 may send a command that is received using the network interface 208. This command may direct the AMD 104 to proceed to find a particular user, follow a particular user, and so forth. The AMD 104 may then process this command and use the autonomous navigation module 164 to determine the directions and distances associated with carrying out the command. For example, the command to "come here" may result in the task module 238 sending a command to the autonomous navigation module 164 to move the AMD 104 to a particular location near the user and orient the AMD 104 in a particular direction.

The speech processing module 222 may be used to process utterances of the user. Microphones may acquire audio in the presence of the AMD 104 and may send raw audio data 250 to an acoustic front end (AFE). The AFE may transform the raw audio data 250 (for example, a single-channel, 16-bit audio stream sampled at 16 kHz), acquired by the microphone, into audio feature vectors 224 that may ultimately be used for processing by various components, such as a wakeword detection module 226, speech recognition engine, or other components. The AFE may reduce noise in the raw audio data 250. The AFE may also perform acoustic echo cancellation (AEC) or other operations to account for output audio data that may be sent to a speaker of the AMD 104 for output. For example, the AMD 104 may be playing music or other audio that is being received from a network 192 in the form of output audio data. To avoid the output audio interfering with the device's ability to detect and process input audio, the AFE or other component may perform echo cancellation to remove the output audio data from the input raw audio data 250, or other operations.

The AFE may divide the raw audio data 250 into frames representing time intervals for which the AFE determines a number of values (i.e., features) representing qualities of the raw audio data 250, along with a set of those values (i.e., a feature vector or audio feature vector 224) representing features/qualities of the raw audio data 250 within each frame. A frame may be a certain period of time, for example a sliding window of 25 ms of audio data 228 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 250, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 224 (or the raw audio data 250) may be input into a wakeword detection module 226 that is configured to detect keywords spoken in the audio. The wakeword detection module 226 may use various techniques to determine whether audio data 228 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 226 to perform wakeword detection to determine when a user intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 226 may compare audio data 228 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 228 (which may include one or more of the raw audio data 250 or the audio feature vectors 224) to one or more server(s) 196 for speech processing. The audio data 228 corresponding to audio obtained by the microphone may be processed locally on one or more of the processors 126, sent to a server 196 for routing to a recipient device or may be sent to the server 196 for speech processing for interpretation of the included speech (either for purposes of enabling voice-communications and/or for purposes of executing a command in the speech). The audio data 228 may include data corresponding to the wakeword, or the portion of the audio data 228 corresponding to the wakeword may be removed by the AMD 104 before processing by another module of the AMD 104, prior to sending to the server 196, and so forth.

The speech processing module 222 may include or access an automated speech recognition (ASR) module. The ASR module may accept as input raw audio data 250, audio feature vectors 224, or other sensor data 152 and so forth and may produce as output data comprising a text string or other data representation. The data comprising the text string or other data representation may be processed by one or more modules of the AMD 104 to determine the command to be executed. For example, the utterance of the command "robot, come here" may result in data comprising the text string "come here". The wakeword "robot" may be omitted from the data.

The collision assessment module 170 determines collision data 182. The collision data 182 may be indicative of a collision occurring, an approximate contact point 108, and so forth.

Measured motion values 262 may be determined that are indicative of movement of the AMD 104. For example, the measured motion values 262 may indicate linear velocity, angular velocity, or other information at particular times. For example, the measured motion values 262 may be determined based on the IMU data 252 that is indicative of, or based on, the accelerations detected by the IMU 136, wheel speed data 256 from the wheel speed sensors 140, and so forth. In some implementations the measured motion values 262 may be provided by other modules.

The detection module 174 may comprise a modeling module 230 and a comparison module 232. The modeling module 230 accepts as input the physical parameters 172 and at least a portion of the sensor data 152 to determine predicted motion values 264. The modeling module 230 may utilize a physics-based model of the AMD 104, as parameterized by the physical parameters 172, to determine the predicted motion values 264. For example, given the motor torque data 254 for each of the driven wheels 130, the modeling module 230 may determine predicted motion values 264 such as a linear velocity indicative of a linear direction and linear speed, an angular velocity indicative of a rotational direction and angular speed, and so forth.

In some implementations the modeling module 230 may also accept input from other modules. For example, the modeling module 230 may accept input from the autonomous navigation module 164, or other modules, that is indicative of instructions to drive the one or more motors 132.

The comparison module 232 accepts as input the measured motion values 262 and the predicted motion values 264 and determines residual values 266. For example, the measured motion value 262 of measured linear velocity with respect to an X axis may be subtracted from a predicted motion value 264 of measured linear velocity with respect to the X axis. The residual values 266 are indicative of a variance between the measured and predicted values. The residual values 266 may then be compared to corresponding threshold values 180. If one or more residual values 266 exceed a corresponding threshold value 180, collision data 182 indicative of a collision may be generated. If the residual values 266 do not exceed the corresponding threshold values 180, the collision data 182 may indicate no collision has occurred.

The residual values 266 may also be used to approximate the contact point 108 of the collision with respect to the AMD 104. For example, the contact point 108 may be determined based on the mathematical sign that indicates if a particular residual value 266 is positive or negative and given information about a coordinate system, such as which direction is +X, which direction is –X, and so forth.

The collision localization module 178 may determine predicted collision location 268 data that is indicative of a predicted location of the contact point 108 with respect to the AMD 104. In one implementation the predicted collision location 268 data may be determined using a machine learning module. For example, a machine learning module may accept as input the IMU data 252 and the velocity residual data indicated by the residual values 266 and determine as output the predicted collision location 268 and a collision confidence value 270. In one implementation the machine learning module may utilize a logistic regression algorithm. In another implementation the machine learning module may utilize an artificial neural network.

In accordance with one or more implementations, a device maintains one or more buffers storing IMU data 252, e.g. a first buffer storing (x,y,z) acceleration data for a first IMU unit of the device and a second buffer storing (x,y,x) acceleration data for a second IMU unit of the device. These buffers may be sized and configured to store data for a defined period of time, e.g. configured to store the last one second worth of IMU data 252. In accordance with one or more implementations, when a collision is detected, a device uses data from one or more buffers to determine a time corresponding to a maximum acceleration, e.g. a time corresponding to a maximum acceleration measured by a first IMU 136 and second IMU 136 within a first time period. In accordance with one or more implementations, a device treats this time as the determined collision time. This time may be used to select data for use in determinations, e.g. may be used to determine a speed of the device prior to the collision.

The residual values 266 may be processed to determine area under the curve (AUC) data 272. In one implementation the AUC data 272 may be calculated using an approximation, such as using Riemann sums with rectangles, Riemann sums with trapezoids, Simpson's rule, and so forth. For example, within the Python development environment, the "trapz" or "Simpson" function may be imported from the NumPy library (promulgated at numpy.org) and used. In other implementations, other algorithms may be used to calculate the AUC data 272.

The collision assessment module 170 may provide other output. In one implementation, the output may comprise an estimation of mass or weight of the AMD 104 based on the sensor data 152. Other output may include data indicative of floor conditions. For example, a coefficient of friction between the AMD 104 and the floor may be calculated. In another example, a determination may be made as to whether the floor is uneven.

The collision data 182 or other data may then be used to operate the AMD 104. For example, if the collision data 182 indicates a collision has occurred, the AMD 104 may stop moving. Continuing the example, based on the collision data 182 indicating an approximate contact point 108, the AMD 104 may proceed to take mitigating action. For example, if the approximate contact point 108 occurred on the left rear of the AMD 104, the AMD 104 may move forward by a specified minimum distance, such as one half of an overall length of the AMD 104, and to the right to move away from the obstacle 106.

In some implementations the collision assessment module 170 may be scheduled to generate collision data 182 and publish or send the collision data 182 to other modules. In other implementations, the collision assessment module 170 may generate collision data 182 only when a collision is deemed to have occurred.

In some implementations the threshold values 180 may vary. For example, the threshold values 180 may vary based on the measured linear velocity with respect to the X axis such that as the speed of the AMD 104 increases, the threshold value(s) 180 changes. In another example, the threshold values 180 may vary based on the mass or weight of the AMD 104.

The task modules 238 may perform particular functions. For example, a videocall task module 238 may provide bidirectional audio and image data to facilitate a videocall. In another example, a sentry task module 238 may operate the AMD 104 to patrol the physical space 102 to look for unauthorized users or anomalous conditions.

The AMD 104 may connect to the network 192 using one or more of the network interfaces 208. In some implementations, one or more of the modules or other functions described here may execute on the processors 126 of the AMD 104, on the server 196, or a combination thereof. For example, one or more servers 196 may provide various functions, such as ASR, natural language understanding (NLU), providing content such as audio or video to the AMD 104, and so forth.

The other modules 240 may provide other functionality, such as object recognition, speech synthesis, user identification, and so forth. The other modules 240 may comprise a speech synthesis module that is able to convert text data to human speech. For example, the speech synthesis module may be used by the AMD 104 to provide speech that a user is able to understand.

The data store 220 may store the other data 276 as well. For example, localization settings may indicate local preferences such as language, user identifier data may be stored that allows for identification of a particular user, and so forth.

Modules described herein, such as the mapping module 160, may provide various processing functions such as de-noising, filtering, and so forth. Processing of sensor data 152, such as image data from a camera, may be performed by a module implementing, at least in part, one or more of the following tools or techniques. In one implementation, processing of image data may be performed, at least in part, using one or more tools available in the OpenCV library as developed by Intel Corporation of Santa Clara, California, USA; Willow Garage of Menlo Park, California, USA. In another implementation, functions available in the OKAO machine vision library as promulgated by Omron Corporation of Kyoto, Japan, may be used to process the sensor data 152. In still another implementation, functions such as those in the Machine Vision Toolbox (MVTB) available using MATLAB as developed by MathWorks, Inc. of Natick, Massachusetts, USA, may be utilized.

Techniques such as artificial neural networks (ANNs), convolutional neural networks (CNNs), deep CNNs (DCNNs), active appearance models (AAMs), active shape models (ASMs), principal component analysis (PCA), cascade classifiers, and so forth, may also be used to process the sensor data 152 or other data. For example, the ANN may be trained using a supervised learning algorithm such that object identifiers are associated with images of particular objects within training images provided to the ANN. Once trained, the ANN may be provided with the sensor data 152 and produce output indicative of the object identifier.

FIG. 3 is a block diagram 300 of some components of the AMD 104 such as network interfaces 208, sensors 134, and output devices 212, according to some implementations. The components illustrated here are provided by way of illustration and not necessarily as a limitation. For example, the AMD 104 may utilize a subset of the particular network interfaces 208, output devices 212, or sensors 134 depicted here, or may utilize components not pictured. One or more of the sensors 134, output devices 212, or a combination thereof may be included on a moveable component that may be panned, tilted, rotated, or any combination thereof with respect to a chassis of the AMD 104.

The network interfaces 208 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the AMD 104 and other devices 198 in the event that communication fails using one or more of the WLAN interface 302 or the PAN interface 304. For example, in the event the AMD 104 travels to an area within the physical space 102 that does not have Wi-Fi coverage, the AMD 104 may use the secondary RF link interface 306 to communicate with another device such as a specialized access point, docking station 194, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the LTE, 5G, 6G, or other standards.

The AMD 104 may include one or more of the following sensors 134. The sensors 134 depicted here are provided by way of illustration and not necessarily as a limitation. It is understood that other sensors 134 may be included or utilized by the AMD 104, while some sensors 134 may be omitted in some configurations.

The motor torque sensor 138 may comprise circuitry to determine a shaft torque of one or more of the motors 132 of the movement system 128. In some implementations, the motor torque may be determined based on back electromotive force, output from a strain gauge, input amperage, rotational speed as provided by a wheel speed sensor 140, or other techniques.

A wheel speed sensor 140 provides information indicative of the rotation or linear extension of a motor 132. The motor 132 may comprise a rotary motor, or a linear actuator. In some implementations, the wheel speed sensor 140 may comprise a separate assembly such as a photodiode and encoder wheel that is affixed to the motor 132. In other implementations, the wheel speed sensor 140 may comprise circuitry configured to drive the motor 132. For example, the autonomous navigation module 164 may utilize the data from the wheel speed sensor 140 to estimate a distance traveled.

A suspension weight sensor 312 provides information indicative of the weight of the AMD 104 on the suspension system for one or more of the wheels 130 or the caster. For example, the suspension weight sensor 312 may comprise a switch, strain gauge, load cell, photodetector 342, or other sensing element that is used to determine whether weight is applied to a particular wheel 130, or whether weight has been removed from the wheel 130. In some implementations, the suspension weight sensor 312 may provide binary data such as a "1" value indicating that there is a weight applied to the wheel 130, while a "0" value indicates that there is no weight applied to the wheel 130. In other implementations, the suspension weight sensor 312 may provide an indication such as so many kilograms of force or newtons of force. The suspension weight sensor 312 may be affixed to one or more of the wheels 130 or the caster. In some situations, the safety module 218 may use data from the suspension weight sensor 312 to determine whether or not to inhibit operation of one or more of the motors 132. For example, if the suspension weight sensor 312 indicates no weight on the suspension, the implication is that the AMD 104 is no longer resting on its wheels 130, and thus operation of the motors 132 may be inhibited. In another example, if the suspension weight sensor 312 indicates weight that exceeds a threshold value 180, the implication is that something heavy is resting on the AMD 104 and thus operation of the motors 132 may be inhibited. For example, the threshold value 180 may comprise a weight of a load that compresses a suspension system to a minimum height, or results in a mass that exceeds a torque output of the motors 132 to maintain a minimum acceleration.

One or more bumper switches 314 provide an indication of physical contact between a bumper or other member that is in mechanical contact with the bumper switch 314. The safety module 218 utilizes sensor data 152 obtained by the bumper switches 314 to modify the operation of the AMD 104. For example, if the bumper switch 314 associated with a front of the AMD 104 is triggered, the safety module 218 may drive the AMD 104 backwards.

A floor optical motion sensor (FOMS) 316 provides information indicative of motion of the AMD 104 relative to the floor or other surface underneath the AMD 104. In one implementation, the FOMS 316 may comprise a light source such as a light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

The distance sensors 142 may comprise one or more of an ultrasonic sensor 318, optical sensor 320, RADAR 322, LIDAR 324, stereo-camera 326, and so forth. In some implementations the distance sensors 142 may use a time of flight of an emitted signal that is reflected by an obstacle 106 to determine a presence of an obstacle 106 and a distance to that obstacle 106. In other implementations, distance sensors 142 may use a pair of stereocameras 326 or other multiple-sensor arrangements to determine a distance to an obstacle 106.

The ultrasonic sensor 318 utilizes sounds in excess of 20 kHz to determine a distance from the sensor 134 to an object.

The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

The optical sensor 320 may provide sensor data 152 indicative of one or more of a presence or absence of an obstacle 106, a distance to the obstacle 106, or characteristics of the obstacle 106. The optical sensor 320 may use time of flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor 134 to have an overall FOV of 40°.

In another implementation, a structured light pattern may be provided by the optical emitter. A portion of the structured light pattern may then be detected on the object using a sensor 134 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 218, and the autonomous navigation module 164 may utilize the sensor data 152 indicative of the distance to an obstacle 106 in order to prevent a collision with that obstacle 106.

Multiple optical sensors 320 may be operated such that their FOVs overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

The sensors 134 may include a RADAR 322. The RADAR 322 may be used to provide information as to a distance, lateral position, and so forth, to an obstacle 106.

The sensors 134 may include a LIDAR 324. The LIDAR 324 may use a projected spot of laser light that is scanned across a scene to provide information as to a distance, lateral position, and so forth, to an obstacle 106.

The sensors 134 may include one or more stereo-cameras 326 or in other implementations other multiple-sensor arrangements to determine a distance to an obstacle 106. For example, sensor data 152 may be acquired by a two or more sensors that are spatially separated and viewing at least a portion of the same scene. An object may be determined to be represented in the sensor data 152 from each, and a relative disparity in apparent position in the sensor data 152 of the object may be used to determine a distance to the object. In another implementation a monocular camera system may be used with other techniques to determine a distance to an obstacle 106.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 218 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more the batteries 280, one or more motors 132, and so forth. In the event the temperature exceeds a threshold value 180, the component associated with that device temperature sensor 330 may be shut down. For example, the threshold value 180 may be determined based on component specifications, such as a maximum permissible temperature of the batteries 280.

One or more interlock sensors 332 may provide data to the safety module 218 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

A gyrometer 334 may provide information indicative of rotation of an object affixed thereto. For example, a gyrometer 334 may generate sensor data 152 that is indicative of a change in orientation of the AMD 104 or a portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyrometer 334 in the accelerometer 336 may comprise a prepackaged solid-state inertial measurement unit (IMU) 136 that provides multiple axis gyrometers 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 152 indicative of impinging light. For example, the photodetector 342 may provide data indicative of a color, intensity, duration, and so forth.

A camera 344 generates sensor data 152 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The AMD 104 may use image data acquired by the camera 344 for object recognition, navigation, collision avoidance, user communication, and so forth. For example, a pair of cameras 344 sensitive to infrared light may be mounted on the front of the AMD 104 to provide binocular stereo vision, with the sensor data 152 comprising images being sent to the autonomous navigation module 164. In another example, the camera 344 may comprise a 10 megapixel or greater camera that is used for videoconferencing or for acquiring pictures for the user.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 164 may be acquired using a rolling shutter and subsequently may be processed to mitigate image artifacts.

One or more microphones 346 may be configured to acquire information indicative of sound present in the physical space 102. In some implementations, arrays of microphones 346 may be used. These arrays may implement beamforming techniques to provide for directionality of gain. The AMD 104 may use the one or more microphones 346 to acquire information from acoustic tags, accept voice input from users, determine a direction of an utterance, determine ambient noise levels, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as a photoelectric detector, ionization chamber, and so forth. In another example, the air quality sensor 350 may include a hygrometer that provides information indicative of relative humidity.

An ambient light sensor 352 may comprise one or more photodetectors 342 or other light-sensitive elements that are used to determine one or more of the color, intensity, or duration of ambient lighting around the AMD 104.

An ambient temperature sensor 354 provides information indicative of the temperature of the ambient physical space 102 proximate to the AMD 104. In some implementations, an infrared temperature sensor may be utilized to determine the temperature of another object at a distance.

A floor analysis sensor 356 may include one or more components that are used to generate at least a portion of floor characterization data. In one implementation, the floor analysis sensor 356 may comprise circuitry that may be used to determine one or more of the electrical resistance, electrical inductance, or electrical capacitance of the floor. For example, two or more of the wheels 130 in contact with the floor may include an allegedly conductive pathway between the circuitry and the floor. By using two or more of these wheels 130, the circuitry may measure one or more of the electrical properties of the floor. Information obtained by the floor analysis sensor 356 may be used by one or more of the safety module 218, the autonomous navigation module 164, the task module 238, and so forth. For example, if the floor analysis sensor 356 determines that the floor is wet, the safety module 218 may decrease the speed of the AMD 104 and generate a notification alerting the user.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 49° at a second time.

The sensors 134 may include a passive infrared (PIR) sensor 362. The PIR sensor 362 may be used to detect the presence of users, pets, hotspots, and so forth. For example, the PIR sensor 362 may be configured to detect infrared radiation with wavelengths between 8 and 14 micrometers.

The AMD 104 may include a mast. A mast position sensor 364 provides information indicative of a position of the mast of the AMD 104. For example, the mast position sensor 364 may comprise limit switches associated with the mast extension mechanism that indicate whether the mast is at an extended or retracted position. In other implementations, the mast position sensor 364 may comprise an optical code on at least a portion of the mast that is then interrogated by an optical emitter and a photodetector 342 to determine the distance to which the mast is extended. In another implementation, the mast position sensor 364 may comprise an encoder wheel that is attached to a mast motor that is used to raise or lower the mast. The mast position sensor 364 may provide data to the safety module 218. For example, if the AMD 104 is preparing to move, data from the mast position sensor 364 may be checked to determine if the mast is retracted, and if not, the mast may be retracted prior to beginning movement.

A mast strain sensor 366 provides information indicative of a strain on the mast with respect to the remainder of the AMD 104. For example, the mast strain sensor 366 may comprise a strain gauge or load cell that measures a side-load applied to the mast or a weight on the mast or downward pressure on the mast. The safety module 218 may utilize sensor data 152 obtained by the mast strain sensor 366. For example, if the strain applied to the mast exceeds a threshold amount, the safety module 218 may direct an audible and visible alarm to be presented by the AMD 104.

The AMD 104 may include other sensors 368 as well. For example, a capacitive proximity sensor may be used to provide proximity data to adjacent objects. Other sensors 364 may include radio frequency identification (RFID) readers, near field communication (NFC) systems, coded aperture cameras, and so forth. For example, NFC tags may be placed at various points within the physical space 102 to provide landmarks for the autonomous navigation module 164. One or more touch sensors may be utilized to determine contact with a user or other objects.

The AMD 104 may include one or more output devices 212. A motor 132 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. An actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the user. Continuing the example, a motor 132 with an eccentric weight may be used to create a buzz or vibration to allow the AMD 104 to simulate the purr of a cat.

Figure 4:
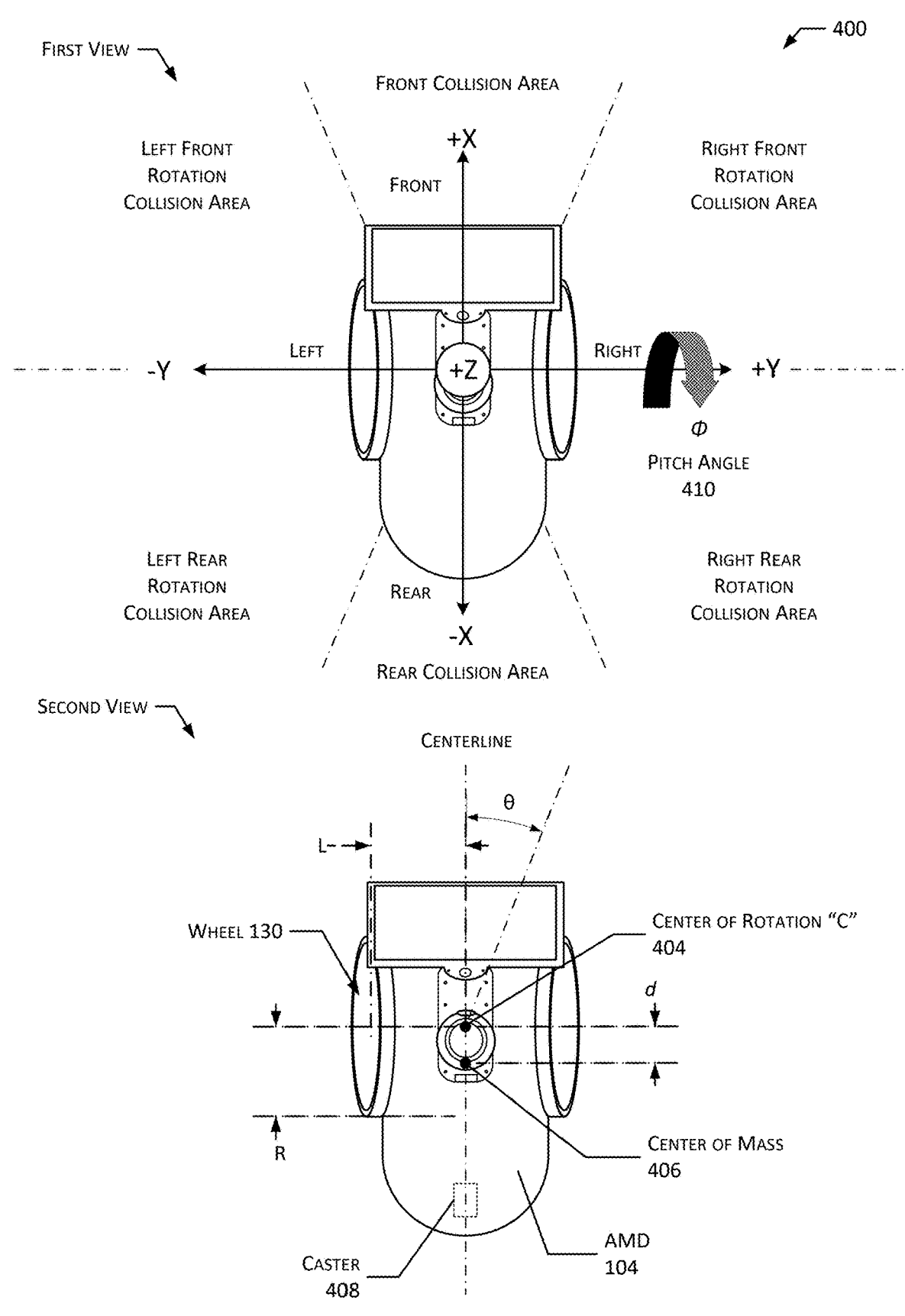
FIG. 4 is a diagram of the AMD, according to some implementations.

FIG. 4 is a diagram 400 of the AMD 104, according to some implementations. In the first view, the AMD 104 is shown with a coordinate system comprising three mutually orthogonal axes as shown with respect to the body of the AMD 104. In this illustration, an X axis extends between the front and rear of the AMD 104 along a centerline of the AMD 104. Positive values of the X axis extend from the origin of the axis towards the front. Negative values of the X axis extend from the origin of the axis towards the rear. A Y axis is perpendicular to the X axis. Positive values of the Y axis extend from the origin of the axis toward the right. Negative values of the Y axis extend from the origin of the axis toward the left. The X and Y axes may define a horizontal plane. A Z axis is perpendicular to the X and Y axes. The Z axis may be aligned vertically. Positive values of the Z axis extend from the origin upward. Negative values of the Z axis extend from the origin of the axis down.

Rotations may be described with respect to respective axes. For example, theta ($\theta$) may describe rotation with respect to the Z axis. In another example phi ($\phi$) may describe a pitch angle 410 comprising rotation along a line through the center of rotation of the wheels 130 and the origin of the axes.

In the second view, a centerline of the AMD 104 is depicted. In one implementation, each wheel 130 may be connected to a separate motor 132, allowing for differential operation and permitting the AMD 104 to move forward, backward, or rotate with respect to a center of rotation "C" 404. A caster wheel 408 may be present proximate to the rear of the AMD 104. The center of rotation "C" 404 is offset with respect to a center of mass 406 of the AMD 104. The center of mass 406 may also be known as a center of gravity.

A length L is shown depicting a perpendicular distance, along the Y axis, between the centerline and each of the wheels 130. A distance d is shown depicting the distance, along the X axis, between the center of rotation "C" 404 and the center of mass 406. A radius R is shown depicting the radius of the wheel 130.

FIGS. 5-8 depict graphs of angular residual values, linear residual values, and pitch values that may be used to characterize a collision as traversable or non-traversable, according to some implementations. In these graphs, a horizontal axis indicates time while a vertical axis indicates residual values 266. Depicted are angular residuals, indicative of a variance between the measured motion values 262 and the predicted motion values 264 associated with angular movement. Also depicted are linear residuals, indicative of a variance between the measured motion values 262 and the predicted motion values 264 associated with linear movement. The units associated with the residual may be dimensional corresponding to their underlying values. For example, a linear residual may be specified as meters/ second. In another example, an angular velocity may be specified as radians/second. In some implementations, the residual values 266 may be expressed as dimensionless values. For example, the residual values 266 may express a dimensionless ratio of the measured and predicted motion values 264.

For ease of illustration and not necessarily as a limitation, the threshold values 180 specify collision threshold range that is centered on 0 and symmetrical. For example, the threshold values 180 may specify a collision threshold comprising a range having a lower bound of −0.5 and an upper bound of +0.5. In some implementations asymmetrical, with respect to 0, ranges may be used. For example, the collision threshold may specify a range of −15 to +10.

Also, for ease of illustration and not necessarily as a limitation, different collision thresholds may be specified for different types of motion such as linear or angular, different axes, or combinations thereof. For example, the threshold values 180 may specify a linear collision threshold range of −0.5 to +0.5 and specify an angular collision threshold range of −15 to +15. In another example, the threshold values 180 may specify a first linear collision threshold range along the X axis of −10 to +10 and a second linear collision threshold range along the Y axis of +15 to −15. In yet another example, the threshold values 180 may specify a pitch angle range that is associated with a collision, such as a pitch angle greater than 10 degrees.

Figure 5:
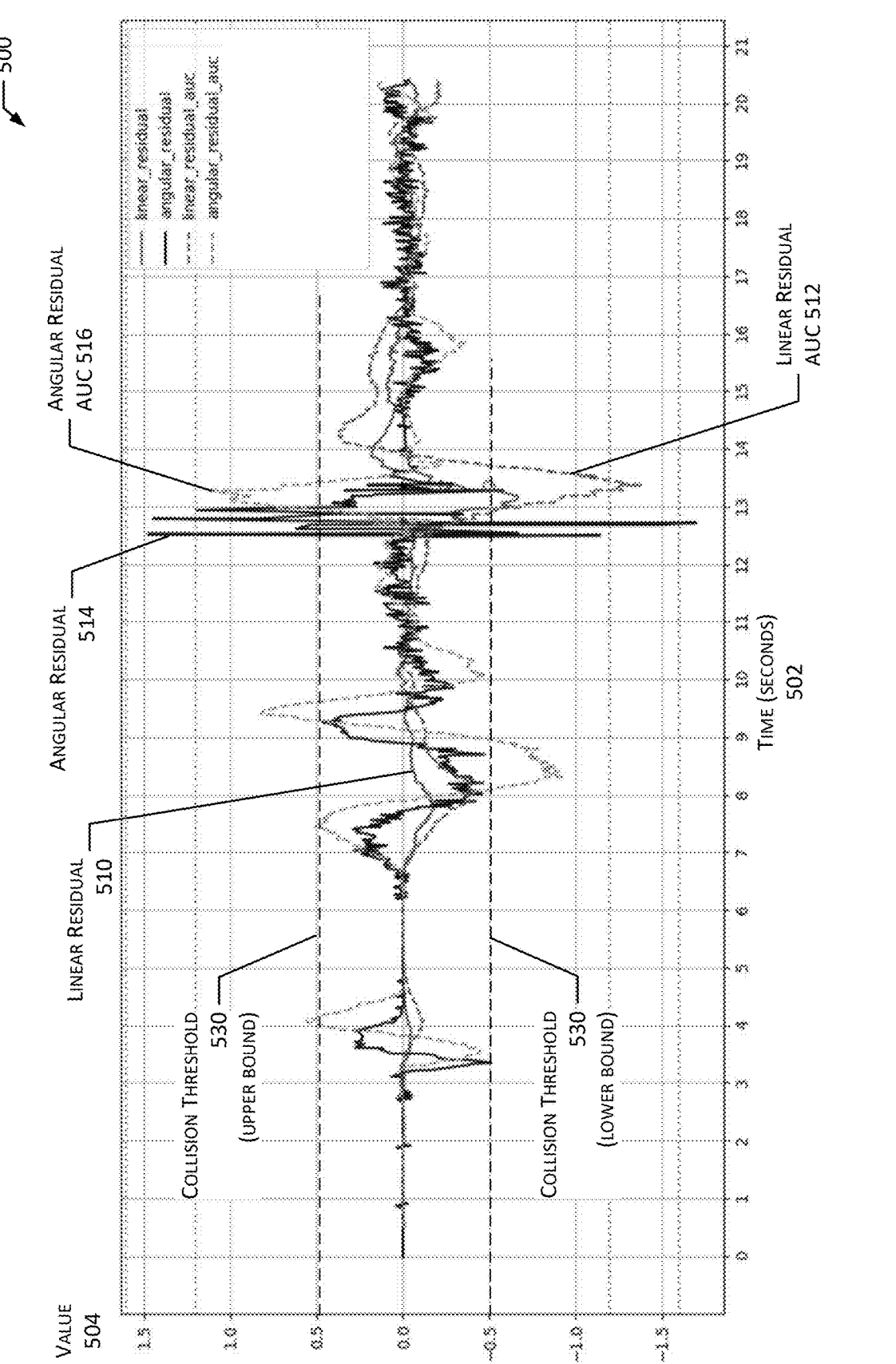
FIG. 5 depicts a graph of angular residual values and linear residual values to characterize a traversable collision, according to some implementations.

FIG. 5 depicts a graph 500 of angular residual values and linear residual values to characterize a traversable collision, according to some implementations.

A horizontal axis depicts time 502 increasing from left to right. A vertical axis depicts values 504 of the curves. The threshold values 180 may specify a collision threshold 530 comprising a single value, a range specified by a lower bound and an upper bound, and so forth. In the implementation shown, the collision threshold 530 specifies a range having an upper bound value of +0.5 and a lower bound value of −0.5.

The graph 500 depicts curves representing angular residual 514 and linear residual 510. From time 0 until 12, the AMD 104 is moving forward along the floor without incident. Shortly after time=12, the angular residual 514 exceeds the upper bound of the collision threshold 530 and the linear residual 510 exceeds the lower bound of the collision threshold 530. A collision event is determined to have occurred after time=12. The collision event is determined to have occurred at the time when both the angular residual 514 and the linear residual 510 exceeded the collision threshold 530. In some implementations a collision event may be deemed to occur when either the angular residual 514 or the linear residual 510 exceeds their respective collision thresholds 530 or only when both residuals exceed their respective collision thresholds 530.

Also depicted are curves representing linear residual area under the curve (AUC) 512 and angular residual AUC 516. The linear residual AUC 512 may be calculated as the AUC of the linear residual values 266. The angular residual AUC 516 may be calculated as the AUC of the angular residual values 266.

The collision event may be determined to have occurred at the time when both the linear residual AUC 512 and the angular residual AUC 516 exceeded the collision threshold 530. In some implementations a collision event may be deemed to occur when either the angular residual AUC 516 or the linear residual AUC 512 exceeds their respective collision thresholds 530 or only when both residuals exceed their respective collision thresholds 530.

In this graph 500, the linear residual AUC 512 and the angular residual AUC 516 maintain values that exceed the collision thresholds 530 and then return within the bounds of the collision thresholds 530. For example, the angular residual AUC 516 exceeds the collision threshold 530 upper bound from before time=13 until before time=14. The linear residual AUC 512 exceeds the collision threshold 530 lower bound before time=13 until about time=14. The return of these AUC values to within the collision thresholds 530 may be used to determine that the collision is traversable.

The approximate contact point 108 of the collision may be determined by analysis of the residual values 266. In the example shown in this graph 500, the negative sign associated with the linear residual 510 that exceeds the lower bound of the collision threshold 530 indicates that the contact point 108 was on the front of the AMD 104.

The positive angular residual 514 may be indicative of a contact on the front left, causing the AMD 104 to rotate slightly with respect to the Z axis. For example, the AMD 104 encountering a flooring threshold at an angle, wherein the left wheel first encounters the flooring threshold, followed by the right wheel encountering the flooring threshold.

Figure 6:
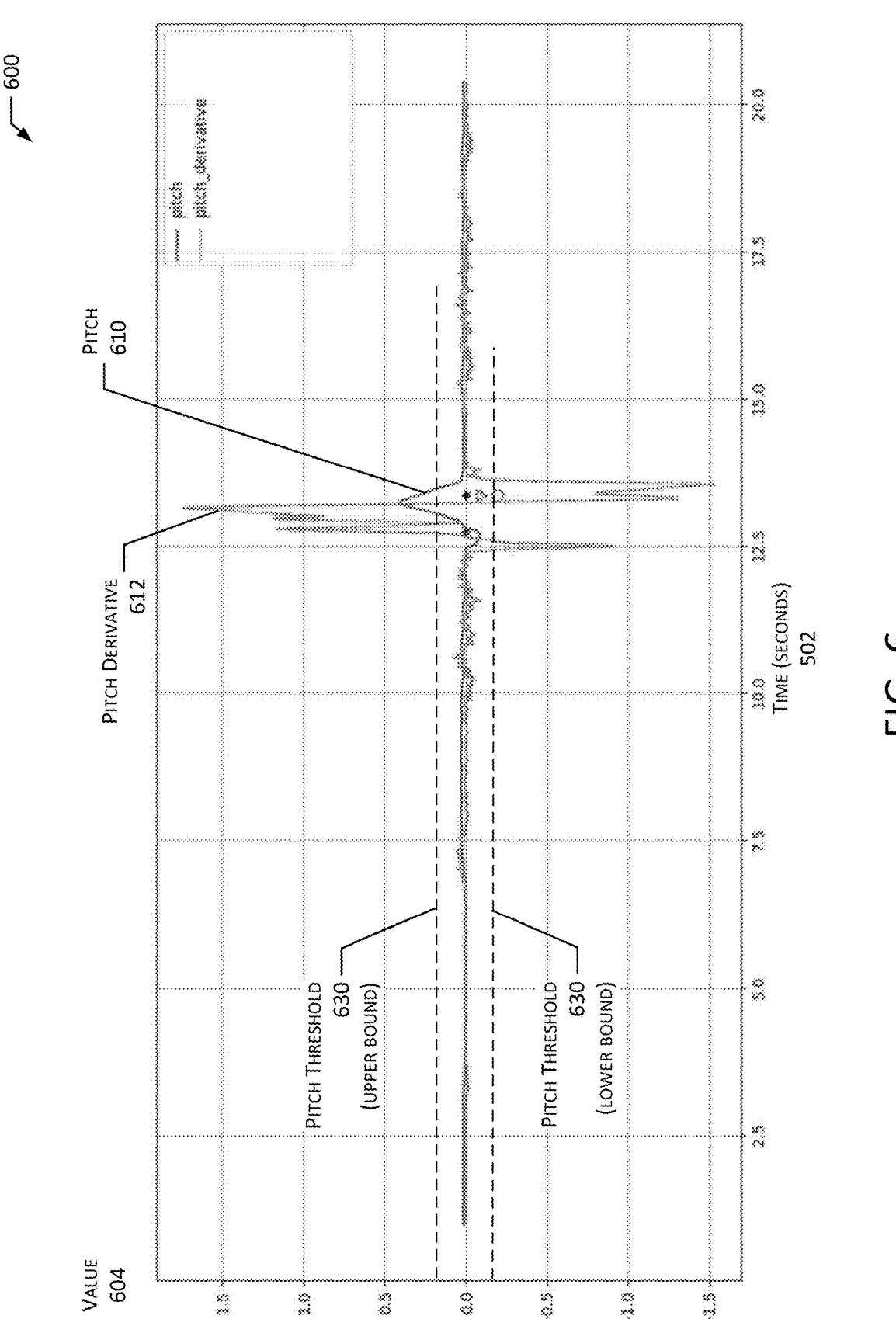
FIG. 6 depicts a graph of AMD pitch values used to characterize a traversable collision, according to some implementations.

FIG. 6 depicts a graph 600 of AMD pitch angle 410 values used to characterize a traversable collision, according to some implementations. This graph 600 continues the scenario described with respect to FIG. 5.

A horizontal axis depicts time 502 increasing from left to right. A vertical axis depicts 604 values of the curves. The threshold values 180 may specify a pitch threshold 630 comprising a single value, a range specified by a lower bound and an upper bound, and so forth. In the implementation shown, the pitch threshold 630 specifies a range having an upper bound value of +0.2 and a lower bound value of −0.2.

The graph 600 depicts curves representing pitch 610 and pitch derivative 612. The pitch 610 and pitch derivative 612 may be based on the pitch angle 410 of the AMD 104 observed at respective times. For example, the pitch derivative 612 may be the first derivative of the pitch 610. From time 0 until about 12, the AMD 104 is moving forward along the floor without incident. Shortly after time=12, the pitch derivative 612 and the pitch 610 exceeds upper and lower bounds of a pitch threshold 630. After the increase in pitch 610 after time=12, the pitch 610 returns to the baseline value of 0. A collision event is determined to have occurred after time=12. As described below with regard to FIGS. 9A and 9B, one or more of the pitch 610 or the pitch derivative 612 may be used to determine the traversability data 186.

Figure 7:
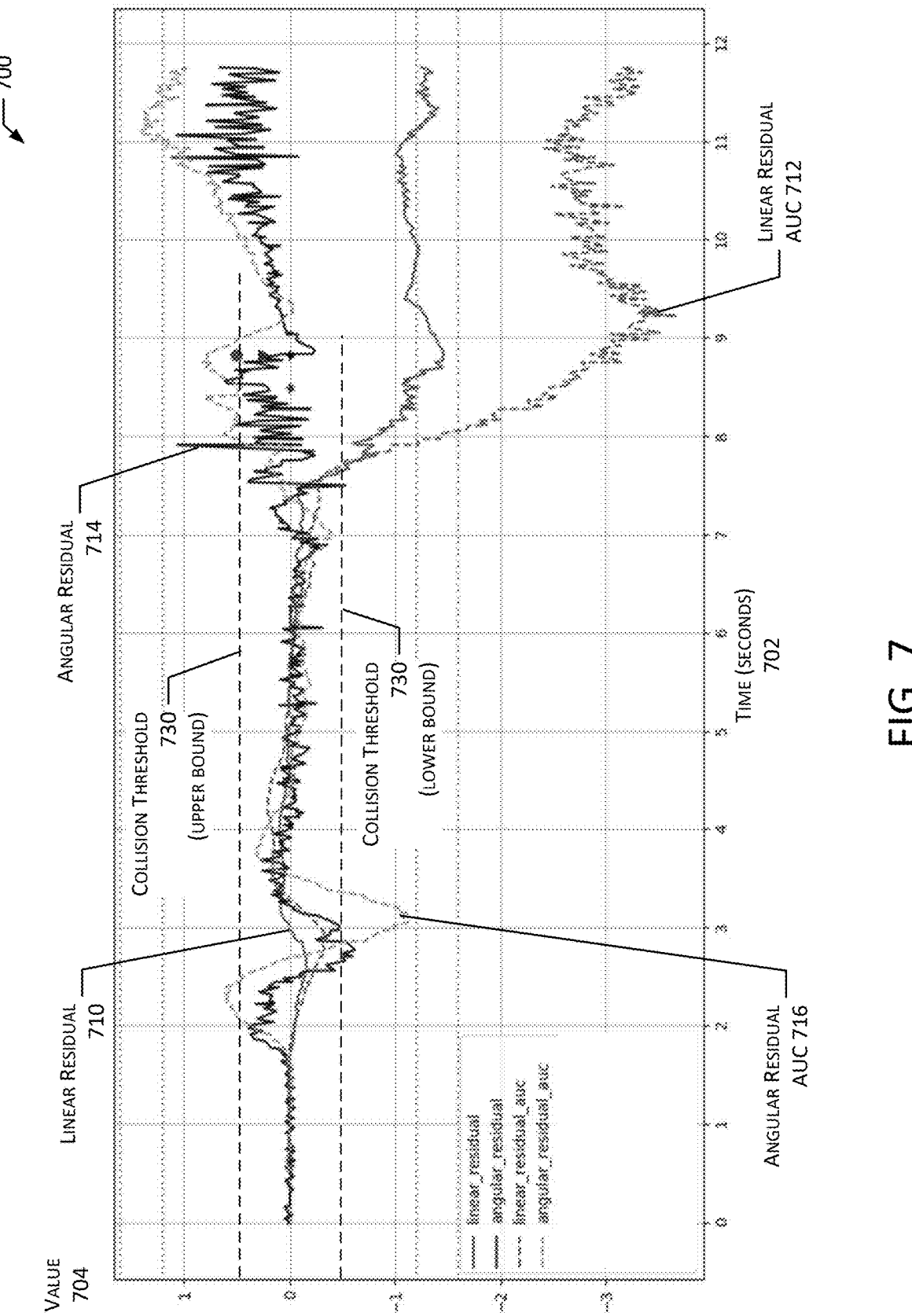
FIG. 7 depicts a graph of angular residual values and linear residual values to characterize a collision involving a non-traversable obstacle, according to some implementations.

FIG. 7 depicts a graph 700 of angular residual values and linear residual values to characterize a collision involving a non-traversable obstacle, according to some implementations.

A horizontal axis depicts time 702 increasing from left to right. A vertical axis depicts values 704 of the curves. The threshold values 180 may specify a collision threshold 730 comprising a single value, a range specified by a lower bound and an upper bound, and so forth. In the implementation shown, the collision threshold 730 specifies a range having an upper bound value of +0.5 and a lower bound value of −0.5.

The graph 700 depicts curves representing angular residual 714 and linear residual 710. From time 0 until 7, the AMD 104 is moving forward along the floor without incident. Shortly after time=7, the angular residual 714 exceeds the upper bound of the collision threshold 730 and the linear residual 710 exceeds the lower bound of the collision threshold 730. A collision event is determined to have occurred after time=7. The collision event is determined to have occurred at the time when both the angular residual 714 and the linear residual 710 exceeded the collision threshold 730. In some implementations a collision event may be deemed to occur when either the angular residual 714 or the linear residual 710 exceeds their respective collision thresholds 730 or only when both residuals exceed their respective collision thresholds 730.

Also depicted are curves representing linear residual AUC 712 and angular residual AUC 716. The linear residual AUC 712 may be calculated as the AUC of the linear residual values 266. The angular residual AUC 716 may be calculated as the AUC of the angular residual values 266.

The collision event may be determined to have occurred at the time when both the linear residual AUC 712 and the angular residual AUC 716 exceeded the collision threshold 730. In some implementations a collision event may be deemed to occur when either the angular residual AUC 716 or the linear residual AUC 712 exceeds their respective collision thresholds 730 or only when both residuals exceed their respective collision thresholds 730.

In this graph 700, the linear residual AUC 712 and the angular residual AUC 716 maintain values that exceed the collision thresholds 730. For example, the angular residual AUC 716 exceeds the collision threshold 730 upper bound from about time=8 to time=9, then after about time=10 again exceeds the collision threshold 730 upper bound. The linear residual AUC 712 exceeds the collision threshold 730 lower bound before time=8 and remains below the lower bound. These ongoing excursions of the AUC values beyond the collision thresholds 730 may be used to determine that the collision is non-traversable.

The approximate contact point 108 of the collision may be determined by analysis of the residual values 266. In the example shown in this graph 700, the negative sign associated with the linear residual 710 that exceeds the lower bound of the collision threshold 730 indicates that the contact point 108 was on the front of the AMD 104, and the positive angular residual 714 may be indicative of a collision that impairs the AMD 104 to rotate to the left.

Figure 8:
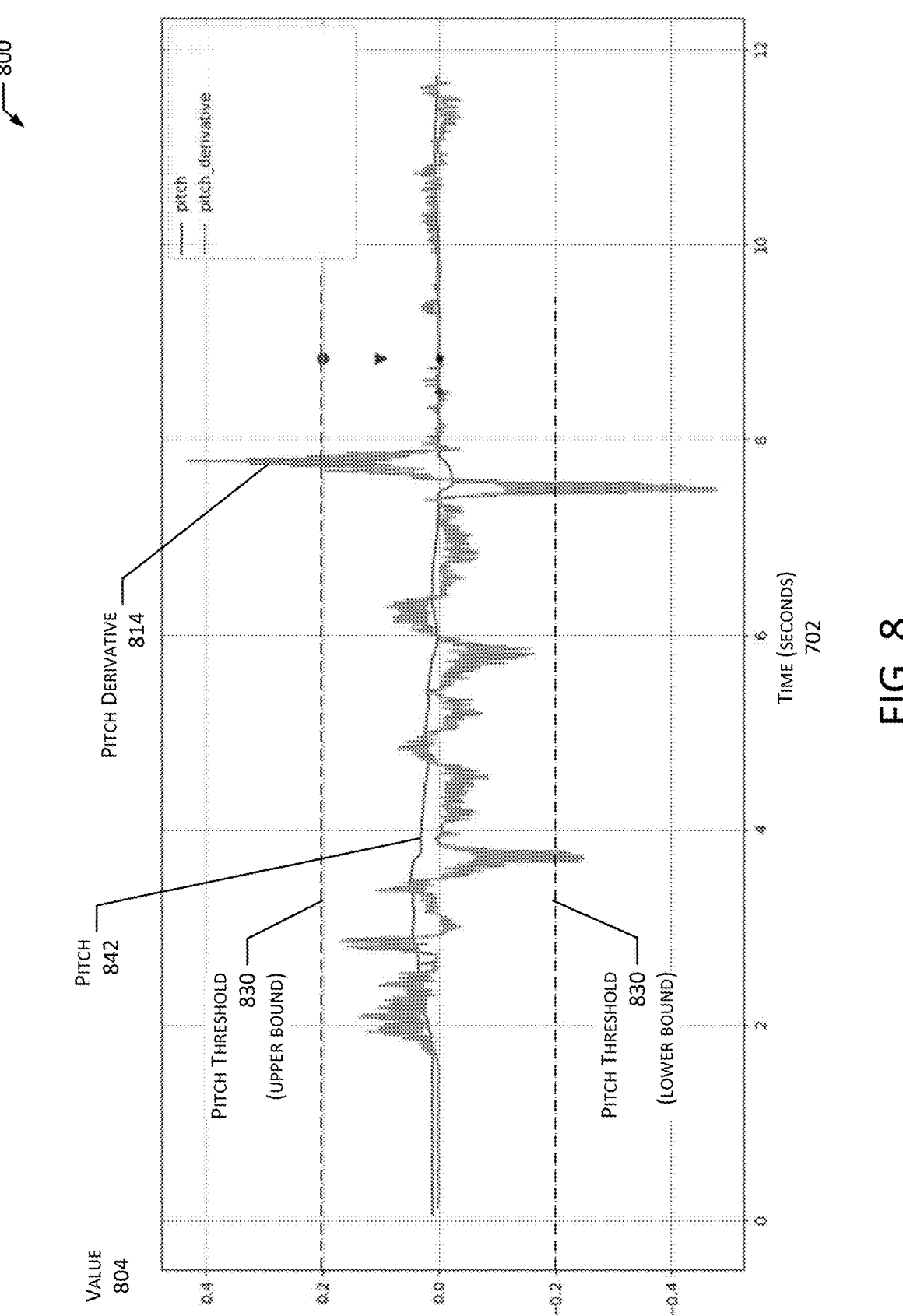
FIG. 8 depicts a graph of AMD pitch values used to characterize a collision involving a non-traversable obstacle, according to some implementations.

FIG. 8 depicts a graph 800 of AMD pitch values used to characterize a collision involving a non-traversable obstacle, according to some implementations. This graph 800 continues the scenario described with respect to FIG. 7.

A horizontal axis depicts time 702 increasing from left to right. A vertical axis depicts 804 values of the curves. The threshold values 180 may specify a collision threshold 830 comprising a single value, a range specified by a lower bound and an upper bound, and so forth. In the implementation shown, the collision threshold 830 specifies a range having an upper bound value of +0.2 and a lower bound value of −0.2.

The graph 800 depicts curves representing pitch 842 and pitch derivative 814. The pitch 842 and pitch derivative 814 may be based on the pitch angle 410 of the AMD 104 observed at respective times. From time 0 until about 7, the AMD 104 is moving forward along the floor without incident. Shortly after time=7, the pitch derivative 814 exceeds upper and lower bounds of a pitch threshold 830. However, the pitch value 842 remains within the upper and lower pitch threshold 830. A collision event is determined to have occurred after time=7. As described below with regard to FIGS. 9A and 9B, one or more of the pitch 842 or the pitch derivative 814 may be used to determine the traversability data 186.

FIG. 9 depicts a block diagram 900 of operation of the AMD 104 to determine traversability and location and of an obstacle 106, according to some implementations. One or more of the operations described with regard to FIG. 9 may be performed by one or more of the processors 126 of the AMD 104.

The one or more sensors 134 of the AMD 104 may provide sensor data 152 to one or more modules, such as the mapping module 160, autonomous navigation module 164, collision assessment module 170, and so forth. In some implementations sensor data 152 may be provided to the movement system 128. For example, the movement system 128 may use sensor data 152 to stop operation of the movement system 128.

As described above, the detection module 174 determines collision event data 184 during operation, the traversability module 176 determines traversability data 186, and the collision localization module 178 determines collision location data 188. Information may be exchanged between one or more of these modules. For example, the detection module 174 may provide residual values 266 to one or more of the traversability module 176 or the collision localization module 178. In another example, the traversability module 176 may determine the area under the curve (AUC) data 272 based on the residual values 266, and this data may be provided to other modules such as the collision localization module 178.

In some implementations one or more of these modules of the collision assessment module 170 may be operated in parallel. For example, the traversability module 176 and the collision localization module 178 may operate simultaneously to determine their respective output.

The collision assessment module 170 may send a stop message 902 to one or more of the autonomous navigation module 164 or the movement system 128. In some implementations a stop signal, such as an interrupt signal, may be used instead of or in addition to the stop message 902. Based on the stop message 902, the one or more motors 132 may be directed to stop, braking may be applied, or other actions performed. In some implementations the stop message 902 or stop signal may be determined based on the determination that a collision event has occurred, as indicated by the collision event data 184, and the obstacle 106 is determined to be non-traversable, as indicated by the traversability data 186.

The collision assessment module 170 may send collision data 182 to one or more of the mapping module 160 or the autonomous navigation module 164.

Based on the collision data 182, the mapping module 160 may generate obstacle data 904 indicative of an obstacle 106, such as a non-traversable obstacle 106 at the location indicated by the collision location data 188 and add this obstacle data 904 to the occupancy map 162.

Based on the collision data 182, the autonomous navigation module 164 may generate motor control data 906 to stop the AMD 104, determine a recovery path indicative of a path the AMD 104 is to follow to attempt to avoid the non-traversable obstacle 106 indicated by the collision data 182, and so forth. The autonomous navigation module 164 may determine motor control data 906 that provides instructions to one or more motor controllers that control operation of elements of the movement system 128, such as the one or more motors 132.

The autonomous navigation module 164 may receive information from the movement system 128. For example, the movement system 128 may provide information about the status of the movement system 128 to the autonomous navigation module 164.

The autonomous navigation module 164 may be in communication with the mapping module 160. For example, the autonomous navigation module 164 may send information indicative of an object detected by SLAM to the mapping module 160. During operation, the autonomous navigation module 164 may access the occupancy map 162.

Other modules of the AMD 104, not shown, may be in communication with those depicted.

Figure 10:
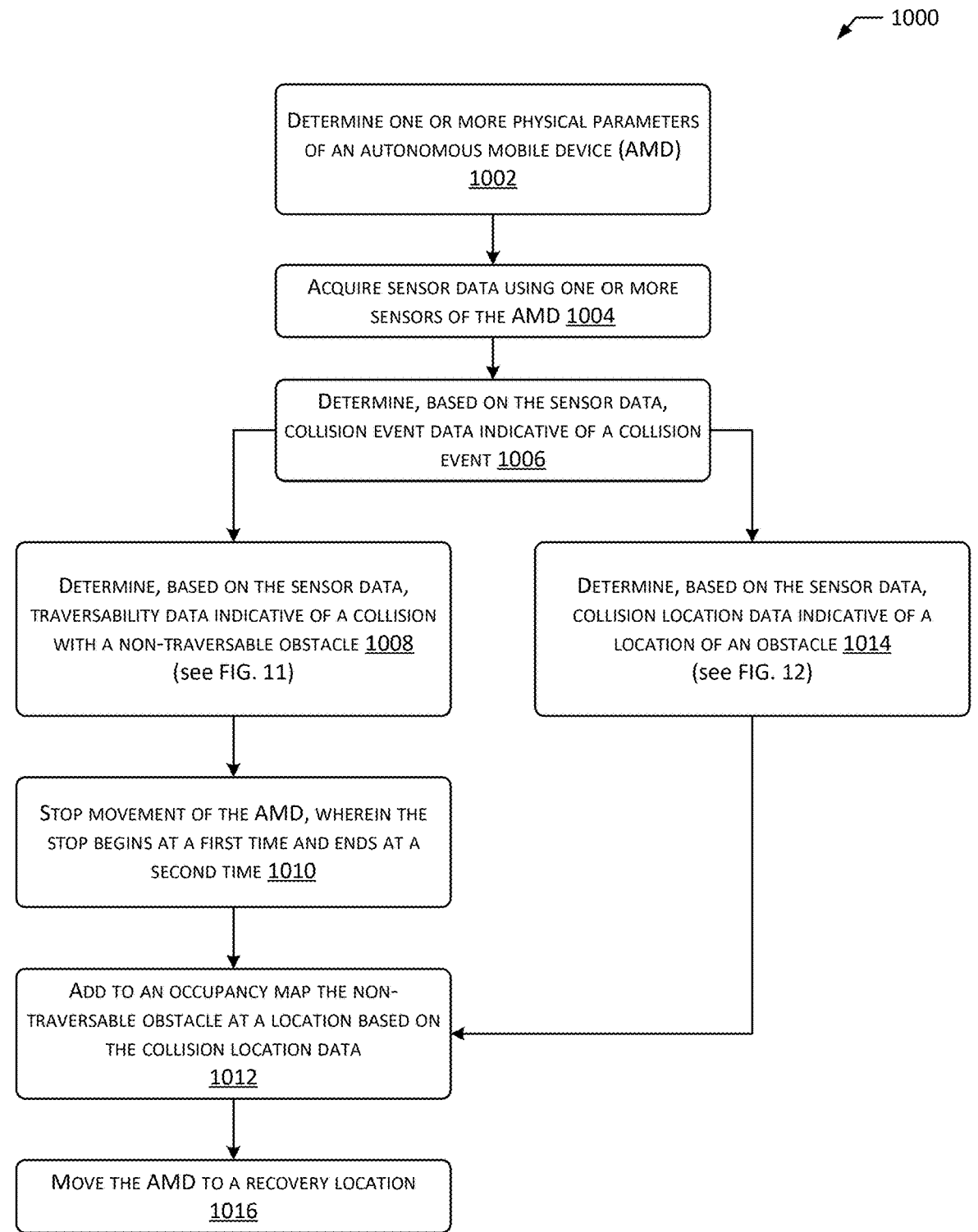
FIG. 10 depicts a flow diagram of a process to determine data indicative of traversability and a location of an obstacle involved in a collision, according to some implementations.

FIG. 10 depicts a flow diagram 1000 of a process to determine data indicative of traversability and a location of an obstacle 106 involved in a collision, according to some implementations. In some implementations, at least a portion of the process may be performed by one or more of the processors 126 of the AMD 104.

At 1002 one or more physical parameters 172 associated with the AMD 104 are determined. In one implementation the physical parameters 172 may be retrieved from storage in the memory 150. The physical parameters 172 may be calculated based on engineering models, physical testing, component data sheets, and so forth. The physical parameters 172 may include one or more of mass (or weight) of the AMD 104, location of a center of mass 406 of the AMD 104, radius R of a driven wheel 130, distance L between a centerline of the AMD 104 and the first wheel 130, moment of inertia of each driven wheel 130, moment of inertia of the body of the AMD 104, information about the exterior shape of the AMD 104 relative to a reference point such as the center of rotation 404, and so forth.

At 1004 sensor data 152 is acquired using one or more sensors 134 associated with the AMD 104. The sensor data 152 may comprise a time series of measurements or data acquired by the sensors 134 at particular times.

At 1006 collision event data 184 indicative of a collision event is determined based on the sensor data 152. In one implementation the detection module 174 may determine a collision based on the motor torque data 254 and the wheel speed data 256. For example, residual values 266 may be determined as described herein, and a collision event may be deemed to occur when one or more residual values 266 exceed a threshold value 180.

In another implementation, a collision may be determined based on the IMU data 252. The IMU data 252 may be indicative of one or more of linear accelerations or angular accelerations. A collision event may be deemed to occur when accelerations with respect to one or more axes exceed a threshold value 180.

At 1008 traversability data 186 is determined. The determination of the traversability data 186 is discussed in more detail with regard to FIG. 11. If the traversability data 186 is indicative of a non-traversable obstacle 106, the process may proceed to 1010. If the traversability data 186 is indicative of a traversable obstacle 106, the AMD 104 may continue to move. In some implementations, the AMD 104 may stop responsive to the collision event, and resume movement if the obstacle 106 is deemed to be traversable.

At 1010 movement of the AMD 104 is stopped. For example, the safety module 218 may receive the stop message 902 and initiate a stop responsive to the determination of the collision event with a non-traversable obstacle 106. The stop begins at a first time and ends at a second time. During a stop, power to one or more of the motors 132 of the AMD 104 may be discontinued, a mechanical brake may be applied, braking power may be applied to one or more motors 132, or other operations may be performed.

At 1012 the location of the non-traversable obstacle 106, based on the collision location data 188, is added to the occupancy map 162 or other representation of the physical space 102.

At 1014 collision location data 188 is determined based on the sensor data 152, that is indicative of a location of the obstacle 106. The determination of the collision location data 188 is discussed in more detail with regard to FIG. 12.

The operations described with regard to 1008 and 1014 may be performed in parallel, or in series.

At 1016 the AMD 104 may perform a recovery maneuver, such as moving away from the non-traversable obstacle 106 to a recovery location.

Based on one or more of the collision location data 188 and the map data, such as the occupancy map 162, the AMD 104 may determine a first path that moves the AMD 104 away from the location of the non-traversable obstacle 106 to the recovery location. The autonomous navigation module 164 may determine path plan data 168 to the recovery location. Based on the path plan data 168, motor control data 906 that is used to operate the movement system 128 is determined. The motor control data 906 may then be used to operate the movement system 128. For example, the AMD 104 may attempt to follow a path that reverses a portion of the path leading to the non-traversable obstacle 106. Once in the recovery location, the AMD 104 may then proceed to move based on updated path plan data 168.

In other implementations other actions may be performed, instead of or in addition to the movement to the recovery location. For example, the AMD 104 may send a message to a device associated with a human user, or to another AMD 104.

Figure 11:
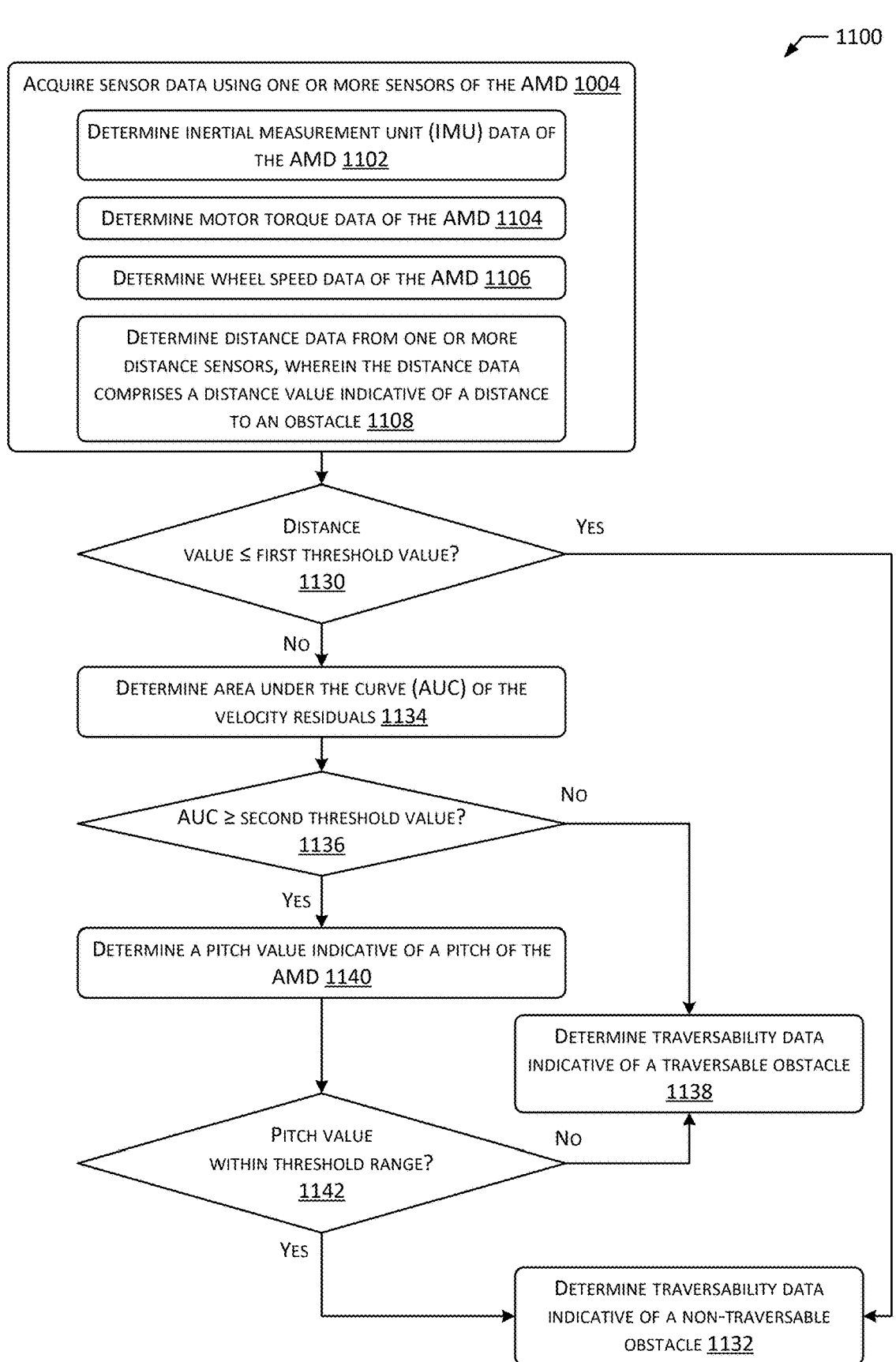
FIG. 11 depicts a flow diagram of a process to determine traversability data indicative of traversability of an obstacle involved in a collision, according to some implementations.

FIG. 11 depicts a flow diagram 1100 of a process to determine traversability data 186 indicative of traversability of an obstacle 106 involved in a collision, according to some implementations. In some implementations, at least a portion of the process may be performed by one or more of the processors 126 of the AMD 104.

As described above with regard to 1004, sensor data 152 is acquired using one or more of the sensors 134 of the AMD 104. In some implementations sensor data 152 may include information acquired from sensors 134 external to the AMD 104, such as sensors 134 on fixed devices in the physical space 102, other AMDs 104, and so forth. This acquisition may include one or more of the following.

At 1102 the IMU 136 may be used to determine IMU data 252. The IMU data 252 may comprise IMU-determined linear accelerations, angular accelerations, linear velocity indicative of translation, angular velocity indicative of rotation, and so forth. The IMU data 252 may also comprise pitch data indicative of a pitch angle 410 of the AMD 104 at a particular time.

At 1104 motor torque data 254 is determined. This may comprise motor torque data 254 that is associated with the collision event. For example, the motor torque sensor 138 may determine motor torque data 254 that is associated with the time of the collision event.

At 1106 wheel speed data 256 is determined. This may comprise wheel speed data 256 that is associated with the collision event. For example, the wheel speed sensor 140 may determine wheel speed data 256 that is associated with the time of the collision event.

At 1108 distance data 258 is acquired from one or more distance sensors 142. This may comprise distance data 258 that is associated with the time of the collision event. The distance data 258 may comprise one or more distance values. Distance values may be associated with the distance sensor 142 that was used during acquisition.

At 1130 a determination is made as to whether the distance value in the distance data 258 is less than or equal to a first threshold value 180. If yes, the process proceeds to 1132. If no, the process proceeds to 1134.

At 1134 an area under the curve (AUC) of the velocity residuals is determined. For example, within the Python development environment, the "trapz" or "Simpson" function may be imported from the NumPy library (promulgated at numpy.org) and used to process one or more of the linear residuals 510 or the angular residuals 514. In other implementations, other algorithms may be used to calculate the AUC data 272.

At 1136 a determination is made as to whether the AUC of the velocity residuals is greater than or equal to a second threshold value 180. If no, the process proceeds to 1138. If yes, the process proceeds to 1140. This may comprise a comparison of one or more of the linear residual AUC 512 or the angular residual AUC 516.

At 1138 traversability data 186 is determined that indicates the obstacle 106 is a traversable obstacle 106. The AMD 104 may then continue to move, such as per prior path plan data 168.

At 1140 a pitch value indicative of a pitch 610 of the AMD 104 is determined. For example, the IMU data 252 may be used to determine the pitch 610 of the AMD 104. The pitch angle 410 value or a value based on the pitch 610, such as a pitch derivative 612 may be determined. In some implementations the pitch angle 410 value corresponding to a particular time after the collision event may be assessed.

At 1142 a determination is made as to whether the pitch angle 410 value is within a threshold range, such as −5 degrees to +5 degrees of pitch 610 relative to horizontal. If no, the process may proceed to 1138. If yes, the process may proceed to 1132.

At 1132 traversability data 186 is determined that indicates the obstacle 106 is a non-traversable obstacle 106. As described above with regard to 1010, the AMD 104 may stop moving responsive to the determination of a non-traversable obstacle 106.

Figure 12:
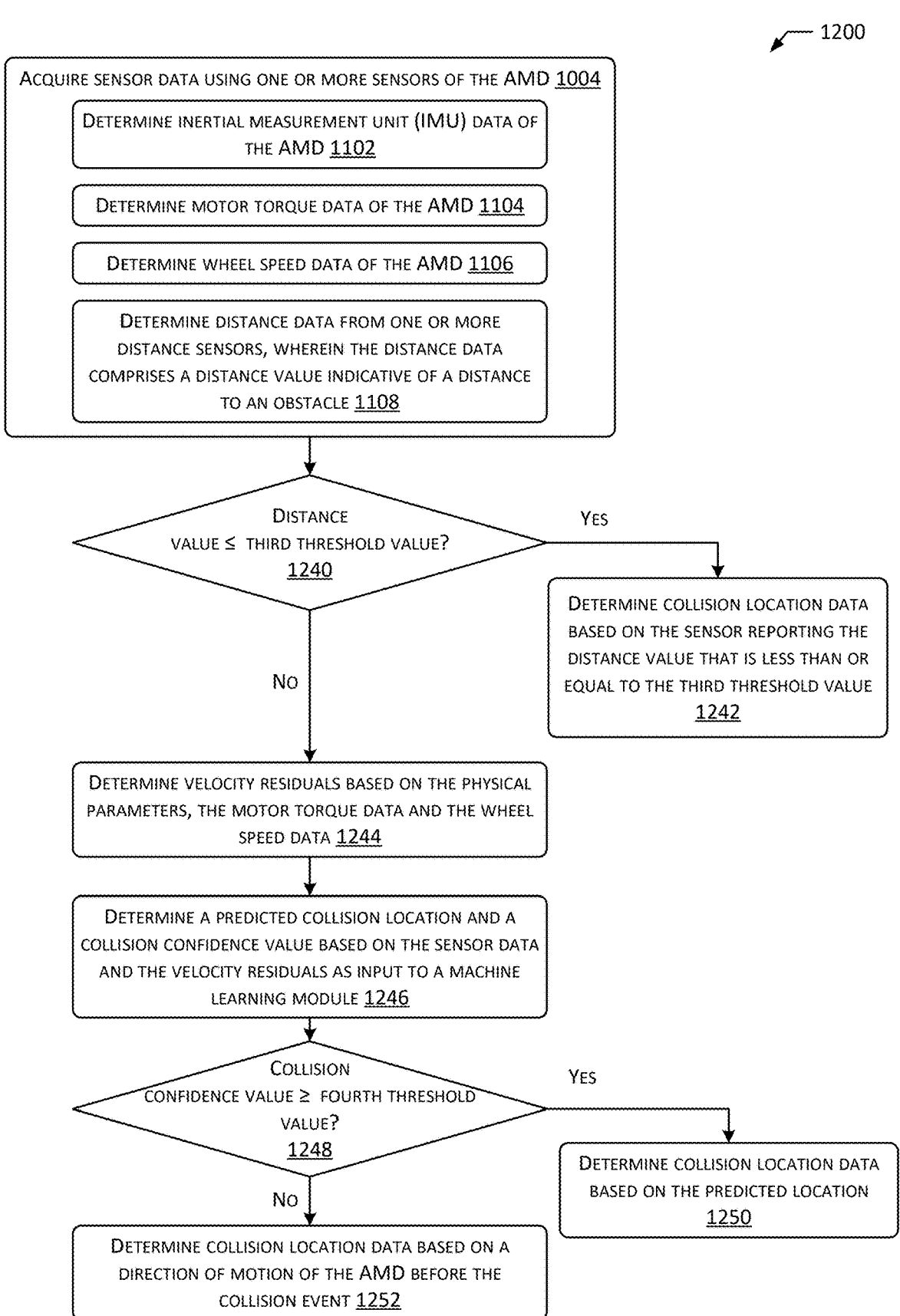
FIG. 12 depicts a flow diagram of a process to determine collision location data indicative of a location of an obstacle involved in a collision, according to some implementations.

FIG. 12 is a flow diagram 1200 of a process to determine collision location data 188 indicative of a location of an obstacle 106 involved in a collision, according to some implementations. In some implementations, at least a portion of the process may be performed by one or more of the processors 126 of the AMD 104.

As described above with regard to 1004 and 1102-1108, sensor data 152 is acquired.

At 1240 a determination is made as to whether a distance value indicated by the distance data 258 is less than or equal to a third threshold value 180. If yes, the process proceeds to 1242. If no, the process proceeds to 1244. In some implementations, the third threshold value 180 may differ from the first threshold value 180 used with regard to the operation at 1130. In some implementations the determination at 1240 may be omitted in lieu of the operation at 1130, for example, the comparison may be performed once per iteration of the process.

At 1242 collision location data 188 is determined based on the distance sensor 142 reporting the distance value that is less than or equal to the third threshold value 180. For example, the third threshold value 180 may specify a distance of 3 centimeters (cm). If a distance sensor 142 having an FOV that is directed forward of the AMD 104 detects an obstacle 106 that is less than or equal to 3 cm from the AMD 104, it may be assumed that the obstacle 106 is associated with the collision. The relative location of the collision with respect to the AMD 104 may be determined based on the information about the distance sensor 142, such as previously stored information that associates a particular distance sensor 142 with a particular FOV. For example, distance sensor 142(1) has an FOV that encompasses a left front collision area, distance sensor 142(2) has an FOV that encompasses a front collision area, distance sensor 142(3) has an FOV that encompasses a right front collision area, and so forth.

Given the information indicative of the relative location and the physical parameters 172, the collision location data 188 may be determined. Continuing the earlier example, if the distance sensor 142(2) detects an obstacle 106 with a distance less than or equal to the third threshold value 180, and given the physical parameters 172 indicating a distance from the center of rotation 404 (or other reference datum) of the AMD 104 to a leading edge of the AMD's 104 exterior of 25 cm, the collision may be deemed to have involved an obstacle 106 that is 25 cm forward of the center of rotation 404. Given localization data 166 that specifies the position and orientation of the AMD 104 in the physical space 102, the location of the obstacle 106 in the physical space 102 may be determined.

At 1244 residual values 266 that are associated with the collision event are determined based on the physical parameters 172, the motor torque data 254, and the wheel speed data 256. The residual values 266 are representative of a variance between predicted motion values 264 and measured motion values 262.

Based on the first set of sensor data 152, a first set of measured motion values 262 are determined. For example, the first set of measured motion values 262 may be indicative of a measured linear velocity, measured angular velocity, and so forth.

Based on the physical parameters 172 and the first set of sensor data 152, a first set of predicted motion values 264 are determined. For example, the physical parameters 172 and the first set of sensor data 152 or data based thereon, may be provided to the modeling module 230 that implements a physics-based model to determine the first set of predicted motion values 264. The first set of predicted motion values 264 may comprise a time series of values associated with, or corresponding to, the times indicated by the first set of sensor data 152.

In one implementation, the modeling module 230 may implement a dynamic model that is expressed using the following equations. The following equations assume the AMD 104 utilizes two equally sized driven wheels 130 and a trailing-caster layout, such as shown in FIG. 4. A predicted velocity of the AMD 104 may be calculated using the following equations and the motor torque data 254 as input.

$$\dot{v}_u = d\dot{\theta}^2 + \frac{1}{MR}(\tau_R + \tau_L) \qquad \text{EQUATION 1}$$

$$\ddot{\theta} = \frac{L}{Md^2 + J}\frac{\tau_R - \tau_L}{R} - \frac{Md}{Md^2 + J}(v_u\dot{\theta}) \qquad \text{EQUATION 2}$$

Where:
$v_u$ is the AMD 104 linear velocity.
$\dot{v}_u$ is the AMD 104 linear acceleration.
$\tau_R$ is the motor torque applied to the right wheel 130.

$\tau_L$ is the motor torque applied to the left wheel 130.
$\dot{\theta}$ is the angular velocity of the AMD 104.
$\ddot{\theta}$ is the angular acceleration of the AMD 104.
J is moment of inertia with respect to the center of mass 406 of the AMD 104.
$\theta$ is rotational angle between initial coordinate system ($x_l$, $y_l$) and AMD Coordinate System ($x_r$, $y_r$).
2L is a distance between the left and right wheels 130 along the orthogonal ($y_r$) axis of the AMD 104.
R is the radius of the left and right wheels 130 of the AMD 104.
M is the mass of the AMD 104 without the driving wheels 130 and actuators.
d is a distance between the left and right wheels 130 and the AMD's 104 center of mass 406 along the longitudinal axis.
$\varphi_l$/$\varphi_r$ is the rotational angle of the left and right wheels 130.

During movement, the AMD 104 encounters several forms of friction. In particular, the friction between the wheels 130 and the floor. In some implementations, the friction may be set to a predetermined value. In other implementations the friction between the wheels 130 and the floor may be calculated. In one implementation, wheel speed data 256 and motor torque data 254 may be used to determine friction data indicative of friction between the wheels 130 and the floor.

The modeling module 230 may use a velocity observer algorithm to dynamically estimate the velocity of the AMD 104 based on the motor torque data 254, the wheel speed data 256, and the friction data. A dynamic estimation of the AMD's 104 velocity $\dot{q}$ may be calculated and used to compute an unknown external force $T_{ext}$. If there is no external force being applied, the velocity observer algorithm exhibits stability, as shown in the following equation.

$$\underbrace{\begin{bmatrix} m & 0 \\ 0 & md^2 + J \end{bmatrix}}_{M}\underbrace{\begin{bmatrix} \dot{v}_u \\ \ddot{\theta} \end{bmatrix}}_{\ddot{q}} + \underbrace{\begin{bmatrix} 0 & -md\dot{\theta} \\ md\dot{\theta} & 0 \end{bmatrix}}_{N(\dot{q})}\underbrace{\begin{bmatrix} v_u \\ \dot{\theta} \end{bmatrix}}_{\dot{q}} = \qquad \text{EQUATION 3}$$

$$\underbrace{\frac{1}{R}\begin{bmatrix} 1 & 1 \\ L & -L \end{bmatrix}\begin{bmatrix} \tau_R \\ \tau_L \end{bmatrix}}_{T_m}$$

Equation 3 may be expressed as:

$$M\ddot{q} + N(\dot{q})\dot{q} = T_m \qquad \text{EQUATION 4}$$

If an external force is present and acting on the AMD 104, the velocity observer algorithm is able to determine rapid changes to the external force, using the following equation:

$$\underbrace{\begin{bmatrix} m & 0 \\ 0 & md^2 + J \end{bmatrix}}_{M}\underbrace{\begin{bmatrix} \dot{v}_u \\ \ddot{\theta} \end{bmatrix}}_{\ddot{q}} + \underbrace{\begin{bmatrix} 0 & -md\dot{\theta} \\ md\dot{\theta} & 0 \end{bmatrix}}_{N(\dot{q})}\underbrace{\begin{bmatrix} v_u \\ \dot{\theta} \end{bmatrix}}_{\dot{q}} = \qquad \text{EQUATION 5}$$

$$\underbrace{\frac{1}{R}\begin{bmatrix} 1 & 1 \\ L & -L \end{bmatrix}\begin{bmatrix} \tau_R \\ \tau_L \end{bmatrix}}_{T_m} = \underbrace{\begin{bmatrix} 1 & 0 \\ 0 & \frac{md^2 + J}{J} \end{bmatrix}\begin{bmatrix} F_{ext} \\ T_{ext} \end{bmatrix}}_{T_{ext}}$$

Equation 5 may be expressed as:

$$M\ddot{q} + N(\dot{q})\dot{q} - T_m = T_{ext} \qquad \text{EQUATION 6}$$

With the velocity observer algorithm output "r" representing an estimated $T_{ext}$, observer dynamics may be defined using the following two equations:

$$\hat{\ddot{q}} = M^{-1}(T_m - N(\dot{q})\dot{q} + r) \qquad \text{EQUATION 7}$$

$$\dot{b} = K(\dot{q} - \hat{\dot{q}}) \qquad \text{EQUATION 8}$$

In accordance with one or more implementations, a system takes torques ($T_m$), measured speeds ($\dot{q}$, $N(\dot{q})$), and the residuals ($T_{ext}$) to estimate the linear and angular acceleration ($\ddot{q}$), and then integrates them to be predicted speeds. The system uses the formula in Equation 7 and calculates the predicted linear and angular acceleration ($\hat{\ddot{q}}$) using the torques ($T_m$) and measured speeds ($\dot{q}$, $N(\dot{q})$), and using a previously estimated set of residual values ($T_{ext}$, initially initialized to zero) from a prior set/loop of calculations for estimating residuals as r.

The system then uses a previous known velocity (e.g. at a time t−1 or associated with an immediately prior set of calculations for estimating residuals) and the predicted acceleration (from this set of calculations) to determine the predicted velocity, e.g. q-dot-current=q-dot-prior+q-dot-dot-hat(t-current−t-prior). The system uses the predicted velocity and the measured velocity to determine r-hat, representing an estimated set of linear and angular residual values, e.g. r-hat=v−v-hat. A hyper parameter K may be used to feedback to the state observer, e.g. r-hat=K(v−v-hat). (This estimated set of residual values will then be used in the next round/loop/set of calculations as noted above.)

In accordance with one or more implementations, this approach may operate to provide as observer output:

$$r(t) = K\left(\dot{q}(t) - \int_0^t M^{-1}(T_m - N(\dot{q})\dot{q} + r)ds - \dot{q}(0)\right) \qquad \text{EQUATION 9}$$

In other implementations, other techniques may be used to determine the first set of predicted motion values 264.

In some implementations one or more of the first set of predicted motion values 264 may be compared with one or more prediction limit thresholds. The prediction limit thresholds may be used to check for predicted motion values 264 that are deemed to be erroneous. In some circumstances, the modeling module 230 may return invalid or physically impossible outputs. For example, a stuck wheel 130 that has excessive torque applied may result in an estimated velocity of the AMD 104 that the AMD 104 would be unexpected to achieve. If at least a portion of the first set of predicted motion values 264 are deemed to exceed the prediction limit thresholds, an error state may be deemed to have occurred. In some implementations, the comparison to prediction limit thresholds may be omitted and the process may proceed.

In some implementations, responsive to the error state, the AMD 104 may perform a mitigating action, such as stopping operation of the motors 132, using an output device 212 to present an error message to a user, and so forth.

If the first set of predicted motion values 264 are within the prediction limit thresholds, the process proceeds to determine a first set of residual values 266 based on the first set of measured motion values 262 and the first set of predicted motion values 264. For example, the residual values 266 may be calculated as a difference between the measured motion values 262 and the predicted motion values 264, or vice versa. The first set of residual values 266 may comprise a time series of values associated with, or corresponding to, the times indicated by the first set of sensor data 152.

In some implementations the threshold values 180 may be retrieved from the memory 150. In other implementations, the threshold values 180 may be determined based on inputs, such as linear speed of the AMD 104, angular speed of the AMD 104, mass or weight of the AMD 104, whether the AMD 104 is carrying a load, mass or weight of the load, and so forth. For example, the threshold values 180 may be increased or decreased based on one or more of linear speed, rotational speed, weight of the AMD 104, weight of a load carried by the AMD 104, and so forth.

In another implementation the threshold values 180 may be determined based at least in part on other data, such as the occupancy map 162. For example, if the AMD 104 is determined to be at a location that is associated with an uneven surface as indicated by the occupancy map 162, the threshold values 180 may be increased.

In some implementations the collision event may be determined based on the comparison of the first set of residual values 266 and the first set of threshold values 180. For example, if the residual values 266 exceed the threshold values 180 a collision event may be deemed to have occurred.

In some implementations the determination as to whether the collision is traversable may be based on comparing a first threshold value 180 to an absolute value of a summation of a set of residual values that includes a zeroth residual value and one or more residual values.

At 1246 a predicted collision location 268, relative to the AMD 104, and a collision confidence value 270 are determined based on the IMU data 252 and the velocity residual values 266 as input to a machine learning module. In one implementation the machine learning module may comprise a logistic regression algorithm that has been trained to classify, based on the inputs, which portion of the AMD 104 collided with an obstacle 106. For example, the machine learning module may be trained to classify a collision as being in one of these classes: "front", "right front", "right rear", "rear", "left rear", or "left front".

At 1248 a determination is made as to whether the collision confidence value 270 is greater than or equal to a fourth threshold value 180. If yes, the process proceeds to 1250. If no, the process proceeds to 1252.

At 1250 collision location data 188 is determined based on the predicted collision location 268. Similar to that described above with regard to 1242, given the relative location of the collision as indicated by the predicted collision location 268, the physical parameters 172, and the localization data 166, the collision location data 188 may be determined that indicates the location of the obstacle 106 with respect to the physical space 102.

At 1252 collision location data 188 is determined based on a direction of motion of the AMD 104 before the collision event. For example, if the AMD 104 was moving forward in a straight line, the collision may be deemed to have occurred at the front. In another example, if the AMD 104 was moving backward in a straight line, the collision may be deemed to have occurred at the rear.

In accordance with one or more implementations, motion of an AMD 104 is stopped upon collision detection prior to determining that a collision is non-traversable. In accordance with one or more implementations, motion of an AMD 104 continues even upon collision detection and stops only upon determining that a collision is non-traversable.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. An autonomous mobile device (AMD) comprising:
one or motors;
one or more wheels;
one or more processors; and
one or more non-transitory computer readable media storing processor executable instructions which, when executed using the one or more processors of the AMD, cause the AMD to perform operations comprising:
determining, based on wheel data for the one or more wheels, a first measured linear velocity and a first measured angular velocity for the AMD,
determining, based on torque data for the one or more wheels, a first predicted linear velocity and a first predicted angular velocity for the AMD,
determining, based on the first predicted linear velocity and the first predicted angular velocity and the first measured linear velocity and the first measured angular velocity, that a collision has occurred,
based on the determining that the collision has occurred:
predicting, based on the first predicted linear velocity and the first predicted angular velocity and the first measured linear velocity and the first measured angular velocity, whether the collision is traversable, and
based on the predicting whether the collision is traversable, causing the one or more motors to effect movement of the AMD.

2. The AMD of claim 1, wherein the AMD comprises one or more accelerometers, a gyrometer, a camera, a time of flight sensor, and a display.

3. The AMD of claim 1, wherein the wheel data comprises wheel encoder data.

4. An autonomous mobile device (AMD) comprising:
one or more motors;
one or more wheels;
one or more processors; and
one or more non-transitory computer readable media storing processor executable instructions which, when executed using the one or more processors of the AMD, cause the AMD to perform operations comprising:
determining, based on wheel data for the one or more wheels, a first measured velocity for the AMD,
determining, based on torque data for the one or more wheels, a first predicted velocity for the AMD,
determining, based on the first predicted velocity and the first measured velocity, that a collision has occurred,
based on the determining that the collision has occurred,
predicting, based on the first predicted velocity and the first measured velocity, whether the collision is traversable, and
based on the predicting whether the collision is traversable, causing the one or more motors to effect movement of the AMD.

5. The AMD of claim 4, wherein the AMD comprises one or more accelerometers, a gyrometer, a camera, a time of flight sensor, and a display.

6. The AMD of claim 4, wherein the first predicted velocity is a predicted linear velocity of the AMD, and wherein the first measured velocity is a measured linear velocity of the AMD.

7. The AMD of claim 4, wherein the first predicted velocity is a predicted angular velocity of the AMD, and wherein the first measured velocity is a measured angular velocity of the AMD.

8. The AMD of claim 4, wherein the wheel data comprises wheel encoder data.

9. The AMD of claim 4, wherein the one or more non-transitory computer readable media store processor executable instructions which, when executed using the one or more processors of the AMD, cause the AMD to perform operations comprising:

determining wheel encoder data, and determining the first measured velocity based on the wheel encoder data.

10. The AMD of claim 4, wherein the one or more non-transitory computer readable media store processor executable instructions which, when executed using the one or more processors of the AMD, cause the AMD to perform operations comprising:

determining a first predicted acceleration based on:

the torque data for the one or more wheels, the first measured velocity, and a zeroth residual value previously determined based on zeroth torque data and a zeroth measured velocity measured prior to measurement of the first measured velocity;

wherein the first predicted velocity is determined based on the first predicted acceleration and the zeroth measured velocity.

11. The AMD of claim 10, wherein the one or more non-transitory computer readable media store processor executable instructions which, when executed using the one or more processors of the AMD, cause the AMD to perform operations comprising:

determining, based on the first measured velocity and the first predicted velocity, a first residual value;

wherein the determining that the collision has occurred is based on the first residual value.

12. The AMD of claim 10, wherein the one or more non-transitory computer readable media store processor executable instructions which, when executed using the one or more processors of the AMD, cause the AMD to perform operations comprising:

determining, based on the first measured velocity and the first predicted velocity, a first residual value; and wherein the determining that the collision has occurred is based on comparing the first residual value to a first threshold value.

13. The AMD of claim 10, wherein the predicting whether the collision is traversable is based on a first residual value.

14. The AMD of claim 10, wherein the predicting whether the collision is traversable is based on the zeroth residual value and a first residual value.

15. The AMD of claim 10, wherein the predicting whether the collision is traversable is based on comparing to a first threshold an absolute value of a summation of a set of residual values that includes the zeroth residual value and a first residual value.

16. The AMD of claim 10, wherein the predicting whether the collision is traversable is based on comparing to a first threshold a summation of absolute values of a set of residual values that includes the zeroth residual value and a first residual value.

17. The AMD of claim 10, wherein the predicting whether the collision is traversable is based on:

the zeroth residual value;

a first residual value; and gyrometer data.

18. The AMD of claim 10, wherein the one or more non-transitory computer readable media store processor executable instructions which, when executed using the one or more processors of the AMD, cause the AMD to perform operations comprising:

determining an estimated collision location using a first machine learning model and based on:

first accelerometer data, the first measured velocity, and a first residual value.

19. The AMD of claim 18, wherein the first machine learning model is a logistic regression model.

20. An autonomous mobile device (AMD) comprising:

one or more motors;

one or more wheels;

one or more processors; and one or more non-transitory computer readable media storing processor executable instructions which, when executed using the one or more processors of the AMD, cause the AMD to perform operations comprising:

determining, based on wheel data for the one or more wheels, a first measured velocity for the AMD, determining, based on torque data for the one or more wheels, a first predicted velocity for the AMD, determining that a collision has occurred, based on the determining that the collision has occurred, predicting, based on the first predicted velocity and the first measured velocity, whether the collision is traversable, and based on the predicting whether the collision is traversable, causing the motors to effect movement of the AMD.

* * * * *